US012458560B2

(12) United States Patent
Akiona et al.

(10) Patent No.: US 12,458,560 B2
(45) Date of Patent: Nov. 4, 2025

(54) THERAPEUTIC CONTENT PERSONALIZATION

(71) Applicant: Aescape, Inc., New York, NY (US)

(72) Inventors: Nicholas Akiona, New York, NY (US); Taya Quandt, New Canaan, CT (US); Andreas G. Hofmann, Cambridge, MA (US); Scott White, Alameda, CA (US); Kathleen Lockhart, Bow, NH (US); Vikas Shivashankar, Andover, MA (US)

(73) Assignee: Aescape, Inc., New York, NY (US)

( * ) Notice: Subject to any disclaimer, the term of this patent is extended or adjusted under 35 U.S.C. 154(b) by 0 days.

(21) Appl. No.: 18/440,715

(22) Filed: Feb. 13, 2024

(65) Prior Publication Data
US 2025/0255772 A1  Aug. 14, 2025

(51) Int. Cl.
A61H 7/00 (2006.01)
B25J 9/10 (2006.01)
B25J 9/16 (2006.01)

(52) U.S. Cl.
CPC .............. A61H 7/004 (2013.01); B25J 9/10 (2013.01); B25J 9/161 (2013.01); B25J 9/163 (2013.01); B25J 9/1664 (2013.01); A61H 2201/0188 (2013.01); A61H 2201/164 (2013.01); A61H 2201/1659 (2013.01); A61H 2201/5007 (2013.01); A61H 2201/5038 (2013.01); A61H 2201/5046 (2013.01)

(58) Field of Classification Search
CPC ........ A61H 7/001; A61H 7/004; A61H 7/007; A61H 2201/1669; A61H 2201/5007; A61H 2201/1659; A61H 2201/0138; A61H 2201/5038; A61H 2201/5046; A61H 2201/5043; A61H 39/04; A61H 15/0078; A61H 37/00; A61G 13/04; B25J 11/008; B25J 9/161; B25J 9/163
See application file for complete search history.

(56) References Cited

U.S. PATENT DOCUMENTS

| | | | |
|---|---|---|---|
| 5,083,552 A | 1/1992 | Lipowitz | |
| 6,267,737 B1 | 7/2001 | Meilus | |
| 7,517,327 B1 | 4/2009 | Knight | |
| 11,285,074 B2 | 3/2022 | Qiu | |
| 11,338,443 B2 | 5/2022 | Eyssautier | |
| 11,685,045 B1 * | 6/2023 | Herzog | B25J 9/161 700/250 |
| 2001/0014781 A1 * | 8/2001 | Nissim | A61H 7/001 601/84 |
| 2017/0266077 A1 * | 9/2017 | Mackin | A61G 13/1235 |

(Continued)

FOREIGN PATENT DOCUMENTS

| | | |
|---|---|---|
| CN | 115870952 | 3/2023 |
| CN | 115972202 | 4/2023 |

Primary Examiner — Joseph D. Boecker
Assistant Examiner — Brian T Khong
(74) Attorney, Agent, or Firm — Van Pelt, Yi & James LLP

(57) ABSTRACT

A robotic massage system includes a robotic arm that is actuated in order to execute a massage plan comprising a plurality of strokes. It further includes a communication interface that receives feedback from a user affecting the massage plan. It further includes a controller that receives state information during execution of the massage plan and modifies the strokes in the massage plan based on the state information and the feedback.

24 Claims, 12 Drawing Sheets

(56) References Cited

U.S. PATENT DOCUMENTS

| | | | |
|---|---|---|---|
| 2019/0160684 A1* | 5/2019 | Gu | B25J 13/087 |
| 2020/0121556 A1* | 4/2020 | Tian | A61H 39/02 |
| 2022/0134551 A1* | 5/2022 | Litman | G16H 50/20 |
| | | | 700/260 |
| 2022/0414291 A1 | 12/2022 | Eyssautier | |

* cited by examiner

THERAPEUTIC CONTENT PERSONALIZATION

BACKGROUND OF THE INVENTION

Existing techniques for generating robotic massage content are inflexible, limiting the different types of massages that can be generated, as well as limiting the ways that massages can be customized for particular users.

BRIEF DESCRIPTION OF THE DRAWINGS

Various embodiments of the invention are disclosed in the following detailed description and the accompanying drawings.

DETAILED DESCRIPTION

Figure 1:
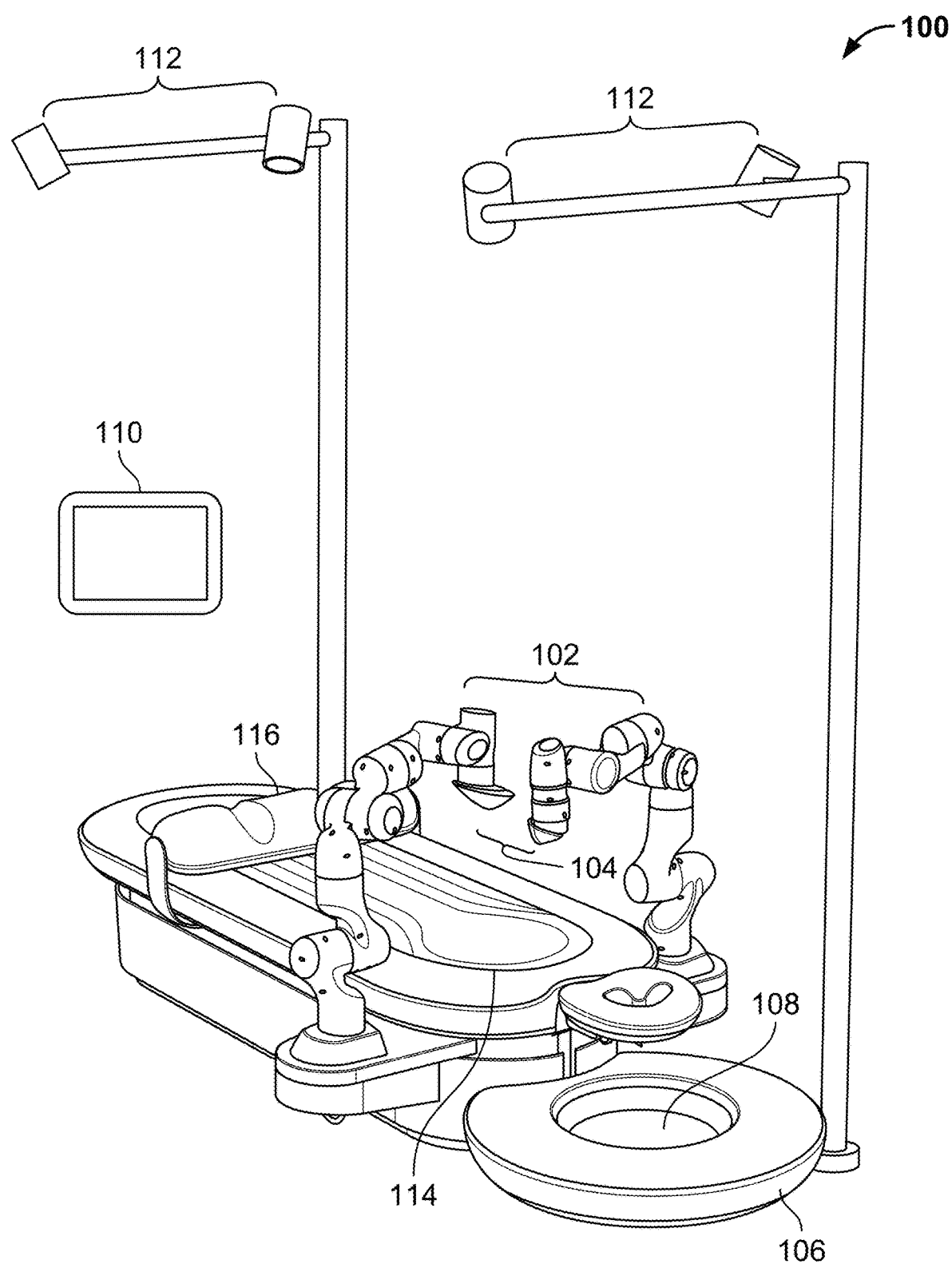
FIG. 1 illustrates an embodiment of a robotic massage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Existing techniques for generating new robotic massage content are characterized by recording sessions that generate long-duration strokes that are manually assembled into a massage. Such existing approaches are not flexible, in that they greatly limit the different massages that can be generated, as well as greatly limit the ways that massages can be customized for particular users. Further, because the strokes are long-duration and not "atomic," they are difficult to re-use and compose into new massages.

Described herein are embodiments of techniques for generating personalized therapeutic content that address the aforementioned challenges with existing techniques for generating therapeutic content. As will be described in further detail below, embodiments of the therapeutic content generation techniques described herein replace existing collections of long-duration strokes with a library of atomic (e.g., short-duration) stroke paths, which can be assembled to generate a wide variety of massages. The use of such a library of atomic stroke paths supports improved customization of robotic massages to support specific user needs and goals, while also supporting various constraints such as time limits.

As will be described in further detail below, in various embodiments of the massage planner system described herein, the massage planner is configured to receive member commands and preferences, load and plan massages, execute massages, and adapt to changing member preferences and constraints. As will also be described in further detail below, the massage planner system described herein is configured to take as input various types of information, such as massage information, member information, and massage history, and deliver as output a customized massage plan specific to the goals and preferences of each member. Further, in some embodiments, the system executes the massage plan, where the system is further configured to change the massage plan while executing the massage plan. The massage planning framework described herein provides improvements over existing massage systems by providing a framework that is customized, personalized, and adaptable in order to better meet subjects' needs and improve their massage experience, while also satisfying constraints such as temporal constraints, safety constraints, progression constraints, etc. Such constraints may be provided as metadata associated with a massage. For example, metadata associated with the massage is included to provide bounds for massage planning (e.g., the targeted length of the massage, which is an example of a temporal constraint).

FIG. 1 illustrates an embodiment of a robotic massage system. Shown in the example of FIG. 1 is an embodiment of an automated massage table that includes robotic arms. In this example, the automated massage table (100) includes two robotic arms (102) that have multiple degrees of freedom and/or movement in order to provide an automated massage to a massage recipient (e.g., without requiring a massage therapist). In this example, each robotic arm (102) includes an end effector (104) located at the distal end of the robotic arm. The end effector (104) is the part of the robotic arm (102) that comes into contact with a massage recipient; other parts of the robotic arm (102) do not come into contact with the massage recipient. In some embodiments, an end effector (104) is a detachably-coupled part of a robotic arm (102) and (if desired) different end effectors (e.g., having different shapes and/or appendages) can be swapped in or out. In some embodiments, the robotic arms are coupled to a base. The base is in turn coupled to a linear rail that allows the base (along with the arms mounted to the base) to translate along the table 114 that the massage recipient lies down on. This increases the coverage of where the end effectors can be placed.

In this example, the automated massage table (100) includes a ring-shaped armrest (106). For example, when a massage recipient is lying in a prone position (i.e., face down) on the automated massage table (100), the massage recipient would rest their hands and forearms on the armrest (106). In the center of the ring-shaped armrest (106) is a touchscreen (108) (or, more generally, a user interface). The touchscreen (108) is one example of a user interface that presents or otherwise displays a body model (e.g., that represents a massage recipient (sometimes referred to herein as a user) of an automated massage) and a control object (e.g., an object displayed by a user interface that can be interacted with by the massage recipient to control and/or manage some aspect of the automated massage). Via the control object and/or touchscreen (108), a massage recipient can control some aspect of the automated massage that is provided via the robotic arms (102), which includes the end effectors (104).

In this example, the automated massage table (100) is associated with and/or in communication with a tablet (110) that includes (another) touchscreen where the tablet (110) is (e.g., physically) separate from the automated massage table (100). In this example, tablet (110) also presents a display that includes a body model and a control object (e.g., in addition to the touchscreen (108)). In this example, a massage recipient can lie down either in a prone (i.e., face down) position with the moveable bolster (116) supporting the ankles, or in a supine (i.e., face up) position with the moveable bolster (116) supporting the knees. When the massage recipient is in a supine position and the touchscreen (108) in the armrest (106) is located behind the massage recipient's head, the massage recipient can more easily see the body model and/or interact with the control object using the tablet (110). It is noted that the tablet (110) and touchscreen (108) are merely examples of a user interface and are not intended to be limiting; any combination and/or types of user interfaces may be used.

The automated massage table (100) also includes four depth-sensing and/or infrared (IR) cameras (112), including lights. In this example, the cameras (112) are used to (e.g., continuously or periodically) generate a user-specific and dynamic body model that is displayed on the tablet (110) and/or the touchscreen (108) in the armrest (106). Examples of body models that may be generated using depth-sensing camera(s) (as well as other body model examples that are generated using other types of sensors) are described in more detail below.

In some embodiments, a body model is generated by combining the four images that are respectively generated by the four depth-sensing cameras (112). In one example, the images are combined and/or blended so that the components of the massage table (e.g., the robotic arms (102) including the end effectors (104), the table (114), the bolster (116), the armrest (106), etc.) are "cut out" to produce a (e.g., body-shaped) body model that corresponds to just the user. In some embodiments, subsequent image filtering (e.g., a vanity filter), manipulation, and/or editing is performed on the (e.g., body-shaped) body model (e.g., for aesthetics, for technical performance reasons (e.g., takes less memory to store and/or is easier to manipulate or transform), etc.).

As is shown in this example, in some embodiments, a robotic arm (e.g., 102) is included in an automated massage table system (e.g., 100) and the robotic arm is movably coupled to the automated massage table system beneath a table (e.g., 114) in the automated massage table system.

As is shown in this example, in some embodiments, a robotic arm (e.g., 102) is included in an automated massage table system (e.g., 100); the automated massage table system further includes a plurality of sensors (e.g., 112) directed towards a table (e.g., 114) in the automated massage table system and that output sensor information; and the body model is based at least in part on the sensor information.

The massage plan structuring techniques described herein may be variously adapted to accommodate other types of robotic massage systems.

Figure 2:
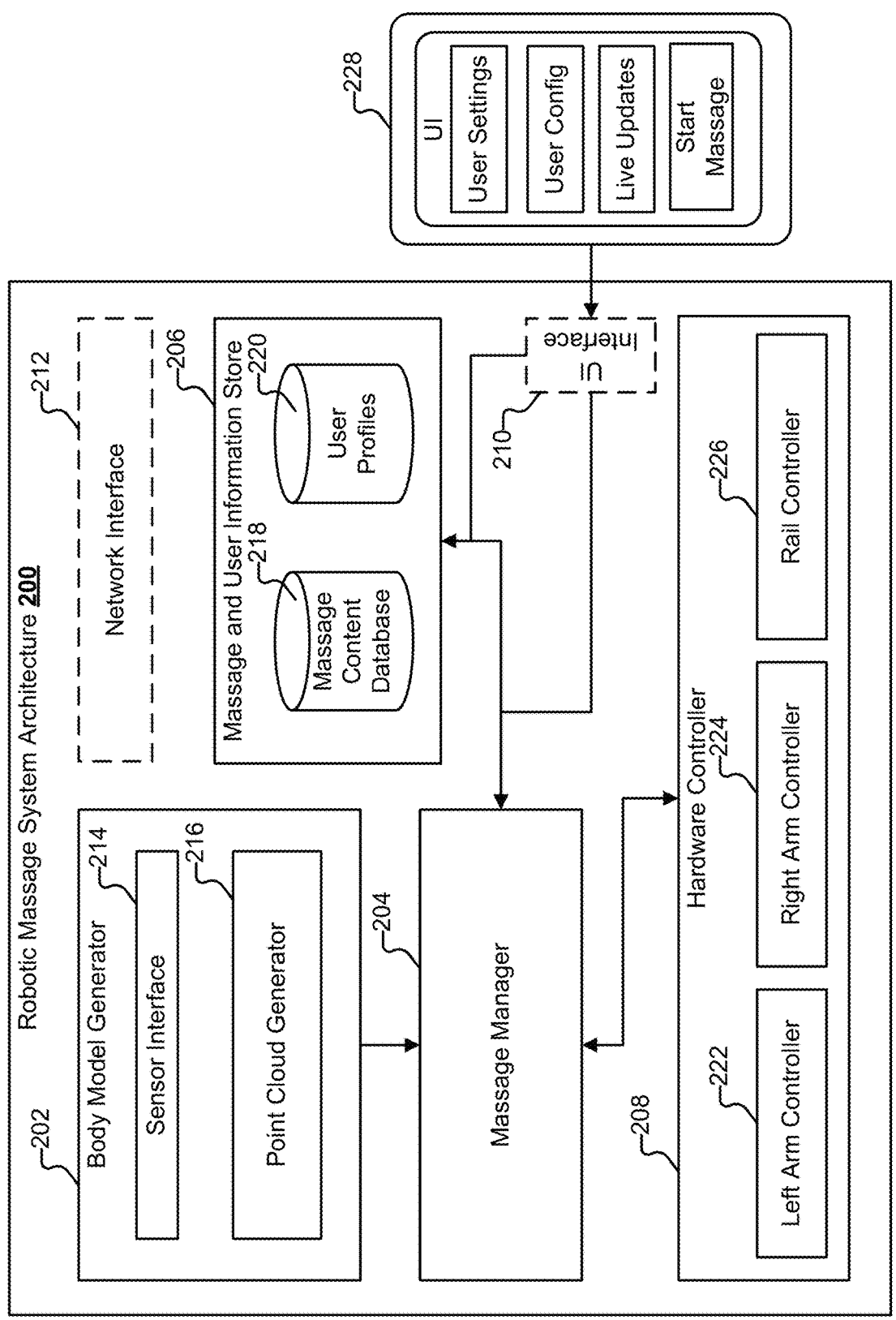
FIG. 2 illustrates an embodiment of a robotic massage system architecture.

FIG. 2 illustrates an embodiment of a robotic massage system architecture. In this example, robotic massage system architecture 200 is configured to control the operation of a robotic massage system such as robotic massage system 100 of FIG. 1.

In this example, the robotic massage system architecture includes body model generator 202, massage manager 204, massage and user information store 206, and hardware controller 208. Architecture 200 further includes interfaces such as UI interface 210 and network interface 212. In this example, UI interface 210 facilitates communication from a device 228 such as touchscreen 108 and/or tablet 110. This allows user inputs to be passed to the robotic massage system. Information may also be passed to the user interface device as well. Network interface 212 facilitates connection of the robotic massage system to external entities over a network such as the Internet.

In this example, body model generator 202 is configured to generate a body model of the user. For example, the body model generator includes sensor interface(s) 214 to sensors such as depth-sensing cameras 112. In some embodiments, the information obtained from the sensors is used by point cloud generator 216 to generate a body model of the user.

In this example, massage and user information store 206 includes massage content database 218 and user profiles 220. In some embodiments, user profiles data store 220 includes profile information pertaining to massage recipients. Such information may include preferences, historical adjustments or requests made by members during previous massages, account information, demographic information, etc.

Massage content database 218 includes massage content. In some embodiments, massage content includes curated massages. In some embodiments, massage content includes individual strokes, of which massages are composed. For example, a massage includes a selected sequence of massage strokes. In some embodiments, information pertaining to massage strokes is also stored in massage content database 218. For example, a massage stroke may be associated with multiple trajectories or stroke paths, as well as additional massage stroke metadata, further embodiments of which are described below.

In this example, massage manager 204 is configured to manage massages. For example, massage manager 204 is configured to generate massage plans as well as execute generated massage plans. In some embodiments, the execution includes a monitoring function that evaluates how the massage is progressing. For example, there may be times where it becomes necessary for the massage manager to change the massage plan being executed. This may be due to a direct user request, a change in constraints (e.g., user has less time than they thought), or general input from the user that they do not like what the system is currently doing. In some embodiments, generating a massage plan includes determining a massage (composed of a selected sequence of massage strokes) to be played on a user. For example, the massage manager takes as input user preferences and goals (e.g., provided via the user interface device), available massage content (e.g., from massage content database 218), and historical user information (e.g., from user profiles 220) to determine an appropriate sequenced selection of strokes to include in a massage.

The massage manager is then configured to determine, based on the massage plan, a sequence of instructions to provide to the hardware (e.g., robotic arms and linear rail) to implement massage strokes. For example, a massage stroke in the massage plan is associated with a path or trajectory along a portion of the member's body that the end effector follows. As one example, the trajectory that the end effector follows is defined as a sequence of interaction goals (also referred to herein as "robotic goals"). Each robotic goal defines a position or location on the user's body that the end effector is to be at and make contact with the user. In addition to including a position, the robotic goal also defines an intensity or amount of pressure/force to be applied by the end effector at that position. As different people have different body morphologies (e.g., bodies of different shapes and sizes), the sequence of robotic goals that is generated for a given massage is also determined based on the body model of the user (e.g., that is generated by body model generator 202).

The sequence of robotic goals generated for a given massage plan for a given user is then executed. For example, the massage manager "plays" the massage by passing the robotic goals sequentially to hardware controller 208. Hardware controller 208 then implements the robotic goal by controlling the hardware components of the robotic massage system, such as a left robotic arm, a right robotic arm, and a rail (via, respectively, left arm controller 222, right arm controller 224, and rail controller 226). For example, the robotic arm controllers are configured to control the joint configurations of the robotic arm(s) and the rail controller is configured to control the position of the movable base along the table in order to position the end effectors at the locations defined in robotic goals while applying specified amounts of force.

Figure 3:
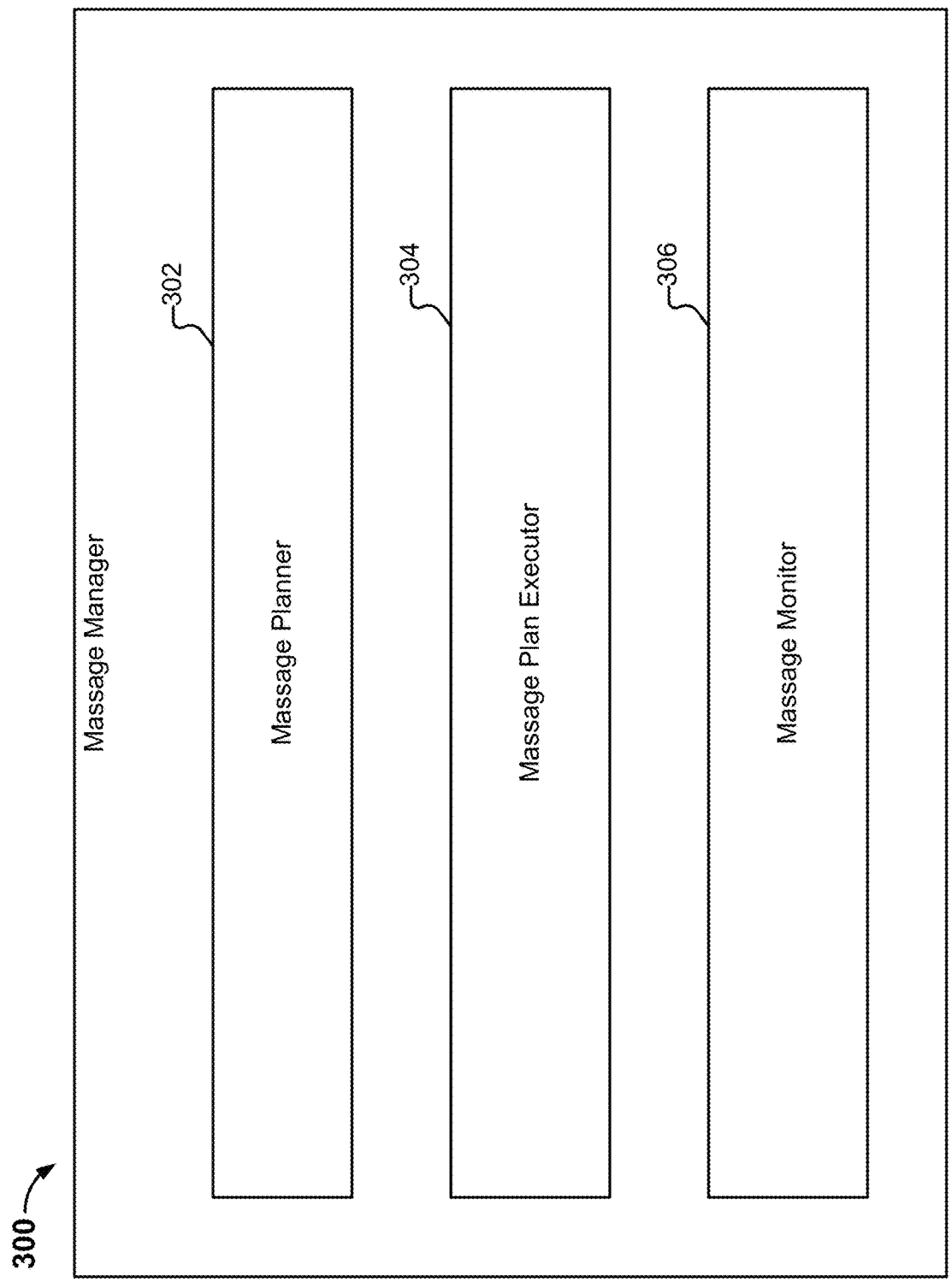
FIG. 3 illustrates an embodiment of a massage manager.

FIG. 3 illustrates an embodiment of a massage manager. In some embodiments, the massage manager 300 is an example of massage manager 204 of the robotic massage system architecture 200 of FIG. 2 that is configured to drive the overall massage experience. In some embodiments, the massage manager is configured to receive member commands and preferences, load and plan massages, execute massages, and adapt to changing member preferences and constraints.

In this example, the massage manager includes massage planner 302. In some embodiments, the massage planner is a component of the massage manager that takes as input massage information, member information, and massage history to deliver a customized massage plan specific to the goals and preferences of each member. For example, a member's past feedback is used to shape a new massage to be provided. As one example, massage adjustments that the member has provided during previous massages are used to inform the composition of new massages to be performed. In some embodiments, input information includes information pertaining to similar segments of users, such as segments of users with similar body morphologies, similar demographics (e.g., occupations, practices, and habits, etc.), etc. For example, massages may be customized based on other users similar to the subject of the massage. The robotic massage system described herein also supports customization from other inputs, such as sensors. For example, in some embodiments, the system is configured to use sensors to detect whether a person has fallen asleep, and adjust massage content in response.

In some embodiments, the member goals or preferences are captured as goals or preferences with respect to specific regions of their body. Example inputs that the user is permitted to provide include, in various embodiments, specific regions to focus on, as well as specific regions to avoid. The user may also specify, for a given region, target intensity and/or target time. Indications of regions to focus on or avoid may be due to various reasons, such as clinical presentation, region preferences, etc. For example, a user may identify or otherwise indicate regions in their body where they are hurt, have pre-existing conditions, etc. Users may indicate their preferences for regions, such as preferences for where they do not enjoy having massage work done (even if there are no underlying injuries). As will be described in further detail below, in some embodiments, massage plans are adapted according to such region indications/preferences. Massage plans can also be adapted according to temporal constraints on the entire massage duration, or on portions of it (such as how much time to spend on a region).

In various embodiments, the inputs described above are used to intelligently anticipate how the massage planner system will adapt a massage for an individual. Inputs may be provided prior to the start of a massage, in order to generate an optimized initial massage. User inputs may also be provided during a massage, resulting in replanning of the remainder of the massage.

Further details regarding inputs to the massage planner are described below.

In some embodiments, based on the various inputs, the massage planner is configured to generate a sequenced selection of massage strokes comprising the massage to be performed. The massage strokes may be selected from massage content database 218. In some embodiments, the sequenced selection of massage strokes is determined to meet member preferences while adhering to constraints (e.g., so that the massage fits within a target length of time). In some embodiments, strokes in the library of massage strokes (stored in the massage content database) are associated with metadata information usable to facilitate their selection and sequencing. Further details regarding the stroke metadata are described below.

In some embodiments, the user-provided inputs are translated into a form that is usable by the massage framework described herein to determine, adapt, or customize an optimal massage for a user. This includes determining the balance of massage strokes included in a massage plan, the intensity of the massage strokes, the amount of time spent in body regions, areas of the body to be included and/or excluded, etc. Variants of massage stroke content may also be selected to provide an optimal experience given a user's preferences, goals, body morphology, etc.

In some embodiments, if inputs are not provided by a user, default input values are utilized. Information from similar subjects may also be used in place of missing user inputs from the subject.

In some embodiments, the massage planner is a generative massage planner that leverages a large library or database of strokes to build the optimal, most personalized plan for a member's goals and preferences, while adhering to a set of constraints.

As described above, in some embodiments, the massage planner system is configured to take the above inputs and generate a massage plan. In some embodiments, a massage plan is composed of a sequence of massage strokes. For example, the massage system includes a stroke library that includes numerous massage strokes (examples of massage content) that can be implemented and executed by the robotic device. Various combinations and sequences of strokes selected from the stroke library may be determined as a massage plan.

In some embodiments, the massage planner system is configured to determine, based on the inputs, an optimized selection and sequence of massage strokes. In some embodiments, determining an optimized selection and sequence of massage strokes includes determining a particular selection of strokes, arranged in a particular sequence, that satisfies the user goals/objectives and preferences, while also satisfying constraints such as time allotments and progression constraints (e.g., constraints on what type of content should precede another piece of content, or what type of content can follow another piece of massage content). In some embodiments, determining an optimal massage plan includes determining transitions between strokes, further details of which will be described below.

In some embodiments, new, customized massage plans are generated from the ground up. In other embodiments, customized massage plans are generated by modifying existing massages, such as therapist-designed or curated massages. For example, pre-generated (e.g., therapist-generated or curated) massages that are largely representative of members' massage goals are utilized as starting points for developing a massage plan that is customized for a specific member.

In this example, the massage manager includes massage plan executor 304. The massage plan executor is configured to execute generated massage plans. This includes determining sequences of robotic goals used to determine how to position or configure the hardware (arms and rail) of the robotic massage system to implement the stroke paths of the strokes in the massage plan according to the member's body morphology (e.g., by using their body model).

For example, the massage plan includes a sequenced selection of strokes. Each stroke is associated with a stroke path that maps out the path or trajectory of the robotic arm(s) over the user's body to implement the stroke. In some embodiments, the stroke path is defined as a sequence of robotic goals, where each robotic goal includes a position on the user's body, as well as further information such as the amount of force to be applied at that position. In some embodiments, during the execution of a massage plan, the massage plan executor is configured to convert stroke robotic goals between different formats or spaces. As one example, the massage stroke executor is configured to convert stroke goals from Cartesian from an original Barycentric format that they are held in.

In this example, the massage manager includes massage monitor 306. The massage monitor is configured to monitor the massage, and trigger adapting of the massage to changing member preferences and constraints. In some embodiments, the massage system adapts to problems that may occur during the massage. For example, if the system has difficulty executing a particular stroke, the system can adapt by skipping that stroke, and replacing it with a similar one. In some embodiments, the massage planner 302 is invoked to update or modify the massage plan according to the changing member preferences and constraints. For example, users may provide, during the massage, indications of work that they would like more of, areas that they would like to avoid, etc. In some embodiments, the massage monitor is also configured to monitor and detect drift with respect to constraints such as remaining allotted time. For example, if the massage monitor detects that the massage up to a certain point in time has taken longer than expected (example of temporal drift), and that there is insufficient time remaining for the massage content in the plan that is yet to be played, the massage monitor triggers restructuring of the remainder of the massage. Further details regarding monitoring and updating of a massage are described below.

In some embodiments, updating or restructuring the massage plan includes reordering strokes, removing and inserting strokes, etc. As another example, restructuring a massage plan includes reselecting and/or resequencing of massage content (e.g., massage strokes).

The following are further embodiments regarding massage planning performed by massage planner 302. In some embodiments, the selection and sequencing of stroke path elements is determined by solving an optimization problem. As one example, the optimization problem involves determining a selected sequence of stroke path elements that optimizes based on user preferences and does not violate constraints. Various factors are taken into consideration when solving such an optimization problem, such as user member preferences/goals, temporal constraints, safety constraints, progression constraints, etc.

For example, as will be described in further detail below, the massage planner leverages mathematical optimization in some embodiments to find the optimal massage plan for a given session (e.g., for a given member, session goals, session length).

In some embodiments, the massage planning optimization is performed according to constraints (that capture what is feasible) and objective functions (that capture what is to be minimized/maximized). The framework of such constraints and objective functions facilitates the use of convex optimization solvers. For example, user preferences may be modeled as objective functions to be optimized (e.g., minimized cost functions and/or maximized reward functions) in the presence of a set of constraints (e.g., constraints to be satisfied or that would result in penalties if violated/not satisfied).

For example, the massage planner framework is used to solve a value or reward maximization problem given the constraint of a budget of time, where the massage planner attempts to insert as much high-value massage content as possible according to the member's preferences.

In some embodiments, solving the massage plan optimization problem includes solving selection and sequencing optimizations problems. For example, solving the massage content selection problem includes determining how to down-select, from all available massage strokes, the specific content to include in a massage plan to be delivered. As one example, solving the massage content sequencing problem includes determining, for a selected content, how to sequence various strokes in a manner that does not violate any constraints (e.g., temporal constraints, safety constraints, etc.), such as ensuring that deep tissue work is not performed without a warmup having been performed first, or to minimize discontinuities. In some embodiments, the selection and sequencing problems are solved sequentially (e.g., selection, and then sequencing). In other embodiments, the selection and sequencing problems are solved simultaneously.

In some embodiments, a solution computed by the massage planner is a sequenced selection of strokes. In various embodiments, strokes include both massage strokes and transition strokes. In various embodiments, transition strokes include strokes that are manually or automatically generated.

In some embodiments, replanning of a massage plan includes determining an updated solution (sequenced selection of strokes) to a constrained optimization problem in response to events such as drift or change in member goals. In some embodiments, the same massage planner is leveraged to perform the replanning. For example, to perform massage replanning, the massage planner is configured to provide as input the current state along with modified objective functions (e.g., that reflect how the member's goals have changed during the session). In some embodiments, the massage planner system described herein solves such optimization planning in an efficient manner to provide near real-time responsiveness (which in turn provides an improved member experience).

As described above, in some embodiments, the massage plan includes a sequenced selection of individual massage strokes. In some embodiments, the massage plan further includes additional metadata associated with the sequence of strokes. In various embodiments, the additional metadata may be used by other components of the robotic massage system to perform other actions. In some embodiments, metadata includes information pertaining to the anatomical features (muscles and bones) that are targeted by a stroke. As another example, metadata also includes control policy information to the controller. In some embodiments, the control policy information is expressed as a set of parameters for the controller, and affects how the stroke feels to the user. An example of a massage plan model is described in further detail below. Examples of metadata include tags indicating a mapping or correspondence of massage strokes to sections or segments of a massage, metadata such as flags for causing certain actions to occur (e.g., lighting of a certain color to be displayed), etc. In some embodiments, the accompanying massage plan metadata is generated based on the selected sequence of strokes. In other embodiments, metadata associated with the massage plan is used to inform the selection and sequencing of massage plans, such as guard conditions in a constraint-based optimization framework, further details of which are described below.

As described above, in some embodiments, the initial massage plan is generated de novo. For example, based on the inputs, the massage planner generates, from scratch, an optimal plan for the user by selecting strokes from the stroke library and sequencing them. The user may then be permitted to make adjustments to the generated massage plan. Collaborative plan diagnosis described above provides a systematic manner to implement this. In other embodiments, the initial massage plan is generated from a seed or proposed massage plan that may be used as a framework to determine a personalized massage plan. For example, a seed massage plan is selected based on an input (e.g., based on an overall goal of the user, such as reducing lower back pain, or full body massage). The seed massage plan may include a preselected sequence of strokes. Based on the body model of the user, as well as other inputs, the seed massage plan is adapted to be personalized to the user (e.g., by removing strokes, substituting strokes, adding strokes, rearranging a subset of the strokes, or otherwise modifying the seed massage plan).

The following are further embodiments of processing performed by massage manager 300.

The massage manager is configured to take as input massage content (e.g., access to a curated massage to start from, or a library of strokes to generate an initial massage plan from scratch), session end-time (example of temporal constraint), and member goals. The following are examples of supported forms of goals:

a. "I'd like to spend more time on my glutes and lower back"—for example, users are permitted to specify specific regions in which they would like to have a larger proportion of the massage time spent.
b. "Focus on region X at a high intensity"—for example, users are permitted to specify specific regions in which higher intensity work is to be performed.
c. "Careful in region Y, go easy there"—for example, users are permitted to specify regions in which lower intensity work is to be performed.
d. "Avoid region Z entirely"—for example, users are permitted to specify regions to be avoided.
e. combinations of the above As shown in the examples above, the system allows the user to specify what they want without having to specify how their preferences are to be implemented. For example, the system provides the user options to specify preferences with respect to regions, pressure, and massage style preferences. The user is not required to specify a detailed sequence of stroke path. Rather, based on the available options that a user is able to select from, and corresponding metadata associated with available strokes in a stroke library, the massage planner is configured to determine a selected sequence of strokes that meets user preferences and satisfies constraints.

Further details regarding inputs to the massage manager/planner are described below.

The following are further embodiments of massage manager 300.

The massage planner 302 is configured to use any provided inputs to compute a sequence of strokes that fits into the available time and optimizes for member goals wherever provided. For example, the massage planner generates a timed massage plan that fits within the available time and whose content is selected and sequenced based on the member's preferences and goals. In some embodiments, the sequence of strokes is determined from strokes in the stroke library. In some embodiments, the sequence of strokes is determined from a starting curated massage. In other embodiments, the sequence of strokes is determined from scratch. In some embodiments, the determined sequence of strokes is provided as an initial massage plan. Further details regarding generating a sequence of strokes will be described below.

The massage plan executor 304 then executes the massage plan. In some embodiments, each massage stroke is associated with one or more possible stroke paths, where each stroke path defines a possible trajectory for implementing the massage stroke. In some embodiments, a stroke path is selected for the massage stroke. For example, the stroke path is selected from a stroke path library. In some embodiments, the stroke path is a generic stroke path, that is agnostic to user body morphologies. In some embodiments, the user's body model is used to adapt or transform the generic stroke path into an executable stroke path that is appropriate for the member. In some embodiments, after the adaptation, the generic stroke paths in the massage plan become executable stroke paths that are executable by the massage plan executor. In some embodiments, the stroke path includes information for both robotic arms. Stroke paths may also be recorded for individual arms, where the massage planner is configured to temporally and spatially coordinate multi-arm (e.g., dual arm) movements.

The massage monitor 306 is configured to monitor drift with respect to the plan. For example, the monitoring is performed on a time-driven basis or at a certain cadence. Further details regarding detecting drift will be described below. In some embodiments, the massage monitor raises an alert if the remaining massage is infeasible against the original constraints.

In some embodiments, based on detected drift or updated member preferences/goals received during the massage, the massage planner 302 is invoked to perform re-planning during the ongoing session. In some embodiments, restructuring of the massage plan includes factoring in already-completed regions, previously-provided member goals (unless overridden by new inputs), etc. In some embodiments, if new inputs result in fast-forwarding a piece of content that is later in the plan, the planner is configured to do so, accordingly. In other embodiments, a new massage is planned from scratch.

Further embodiments of restructuring of massage plans are described below.

Embodiments of Session and Member Customization Features

In some embodiments, to provide a curated, personalized experience, the massage planner is configured to both generate an initial plan for the massage before it starts and subsequently re-plan the massage as it receives new information or observes drift from the original plan.

The following are embodiments of constraints/features supported by embodiments of the massage planner described herein.

In some embodiments, the massage planner supports time-guaranteed massages. In various embodiments, this includes enforcement of a session end-time, a maximum massage time, and a minimum massage time. In some embodiments, supporting time-guaranteed massages includes facilitating adaptation to time drift.

In some embodiments, the massage planner supports adjustable time allocations. In various embodiments, this includes area-based time allocations. Region-based time allocation further includes areas or regions to spend more time on, as well as areas to avoid. In some embodiments, supporting adjustable time allocation includes stroke type/intensity time allocations. In some embodiments, supporting adjustable time allocation includes facilitating more of some types of work, and less of some other types of work.

In some embodiments, the massage planner supports massage content reordering. For example, pre-massage, the massage planner performs ordering to initial member preferences/targeted regions. In some embodiments, the massage planner is configured to support reordering in-massage. In some embodiments, in-massage reordering includes reordering to support member interactions and updated preferences provided by the user during the massage.

Example Massage Planner Behavior

As described above, a massage plan includes a sequenced selection of strokes. Given a large amount of strokes available in a stroke database, there are numerous possible permutations and combinations of strokes that can be generated. That is, there is a large state space for the possible massage plans that can be created. In some embodiments, the massage planner is configured to determine an optimal massage plan for the user based on user preferences, constraints, etc. In some embodiments, the state space that massage planning is performed over is reduced or simplified by strategically performing one or more of the following:

- Utilize pre-generated human-curated massages that are largely representative of members' massage goals.
- Utilize massage metadata (either implicit or explicit) for an initial distribution of time spent on various regions and types of work. An example of such an initial distribution includes a predefined distribution of muscle/region coverage and type of massage work (e.g., deep tissue content versus relaxing effleurages).
- In some embodiments, limiting the massage content being planned over by only having a multiple (e.g., 1.5×) of the necessary massage content available to be planned over for any given massage.
- Allowing stroke reordering with respect to only specific layers or sections or segments or portions in a timeline model representation of a massage plan. For example, in some embodiments, segments of strokes can be dynamically reordered, whereas strokes within a segment are not dynamically reordered. In some embodiments, the utilization of layers simplifies the reordering problem by fixing the strokes in a segment, and further facilitates the ability to provide natural progressions throughout a massage. In other embodiments, such progressions are represented using pre and post-conditions.
- Optimizing the number of auto-generated transition strokes. A massage plan includes multiple strokes being performed on a user in a sequence. Each stroke follows a path or trajectory on a portion of a user's body. The end position of one stroke may not continue seamlessly into the starting position of the starting goal of the next stroke being played. In some embodiments, transition strokes are automatically generated to connect the end of one stroke to the beginning of another. Depending on the selection and sequencing of strokes in a massage plan, different transitions strokes will need to be generated. In some embodiments, optimizing the selection and sequencing of massage strokes includes generating sequences where the transition strokes are short. Further details regarding transition strokes are described below.
- Determining and recognizing that a resulting massage plan from the optimization is not able to meet the full set of goals for a member's massage (e.g., due to certain constraints not being able to be met if all goals were included). In some embodiments, in such a case, the massage planner is configured to notify the user of the most optimal plan, and what constraints or goals could not be met. The massage planner is also configured to provide options for updating preferences or constraints to facilitate massage replanning. Other massages that are better suited to the user may also be suggested or recommended as output. This can be done as part of a collaborative plan diagnosis framework.

Figure 4A:
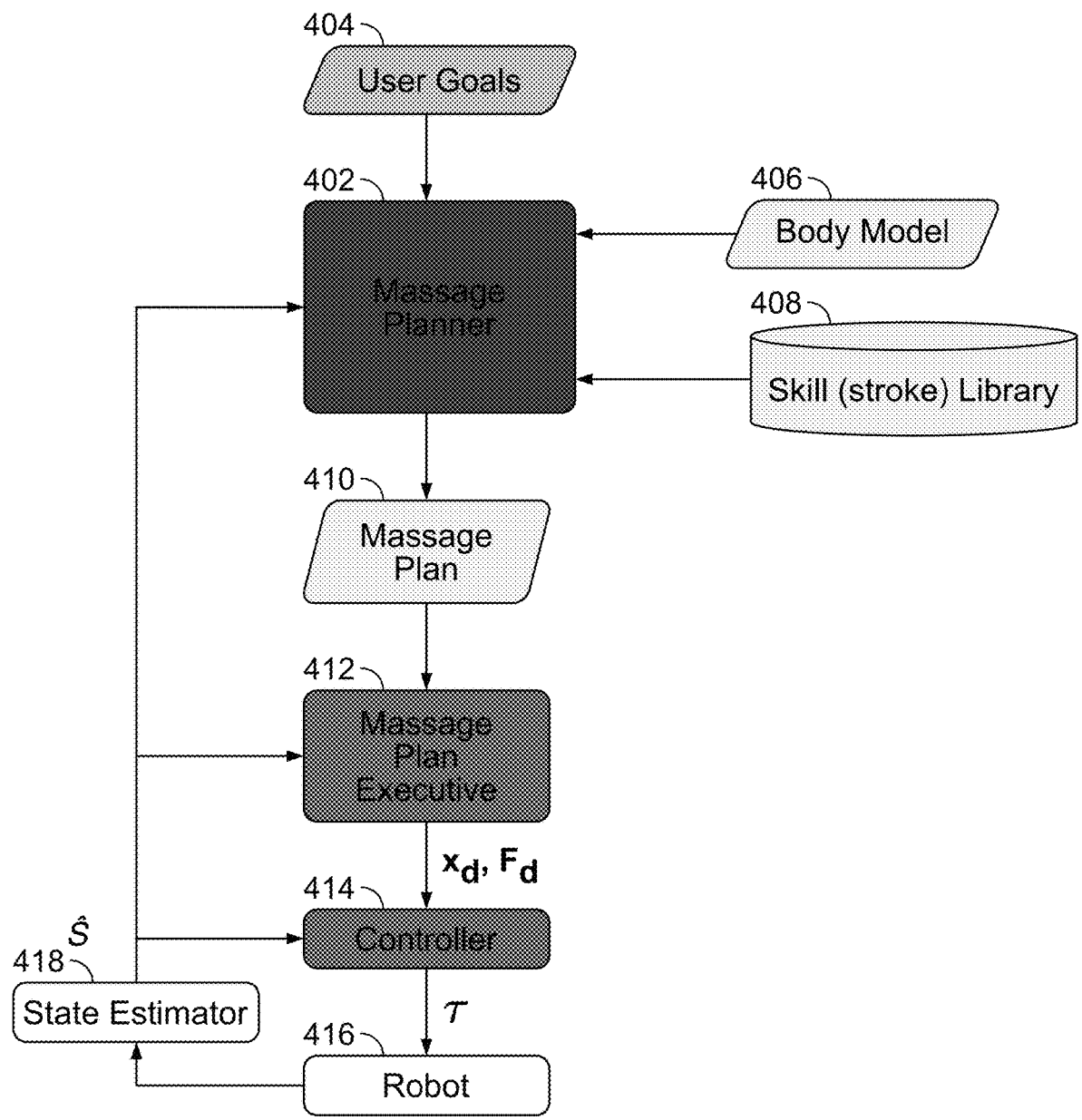
FIG. 4A is a flow diagram illustrating an embodiment of a process for massage planning.

FIG. 4A is a flow diagram illustrating an embodiment of a process for massage planning. In this example, a massage planner 402 is configured to generate massage plans based on user goals 404, a body model 406, and a stroke path library 408. As one example, massage planner 402 is an embodiment of massage planner 302. The massage plan 410 generated by the massage planner is then executed by massage plan executive 412. In this example, massage plan executive 412 is an example of massage plan executor 304. In some embodiments, the massage plan executive is configured to interpret the massage plan and generate robotic goals for the controller 414. One example of controller 414 is hardware controller 208. The controller 414 is used to control robot 416, which includes the robotic arms and linear rail of the robotic massage system of FIG. 1. In this example, the massage planner, executive, and controller consume an optimal state estimate computed by state estimator 418. In some embodiments, the state estimator is configured to compute what is occurring. In some embodiments, this includes filtering sensor noise, and estimating the true state of what is occurring from noisy sensor data. As one example, this includes determining how much the massage touchpoint is displacing the massage surface. In some embodiments, at a higher level, it provides input to the monitor. In some embodiments, the monitor is configured to determine how much the massage is drifting in time.

Figure 4B:
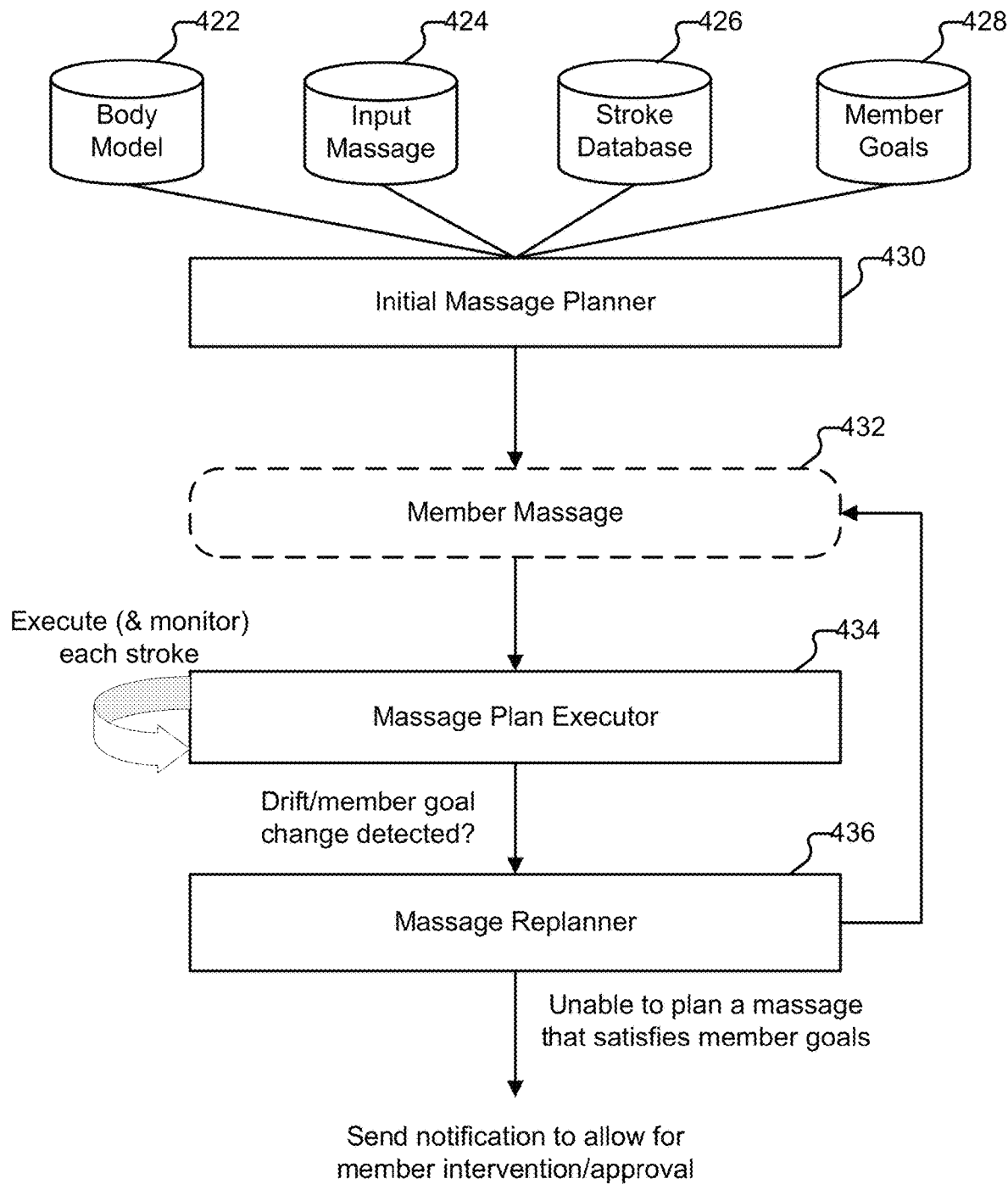
FIG. 4B is a flow diagram illustrating an embodiment of a process for massage planning.

FIG. 4B is a flow diagram illustrating an embodiment of a process for massage planning. In some embodiments, the process flow shown in the example of FIG. 4A is implemented by massage manager 300 of FIG. 3. In this example, an example massage planning lifecycle is shown.

In this example, at the start of the session, the massage manager is configured to receive various input information including, for example:
  a body model 422 of the member, which is used to inform feasible strokes
  in some embodiments, a selected therapist-defined massage (input massage 424) that is consistent with the member's goals, along with any associated metadata. For example, a curated massage is selected, where modifications or refinements are made from the selected massage. In other embodiments, the customized massage plan is made from scratch (generated from the pool of all available strokes), without starting from a selected therapist massage.
  a database of strokes 426 to facilitate refining of the selected massage. The database of strokes may also be utilized when generating an initial massage plan from scratch.
  member goals 428—These may include requests with respect to specific regions of the body to focus on and/or avoid, along with target times and/or target intensities.

In this example, the massage manager is then configured to invoke the initial massage planner 430 (e.g., massage planner 302) to generate an initial massage plan of the target length that is consistent with the member goals. In some embodiments, the initial planning cycle is performed at a backend. In other embodiments, the initial planning cycle is performed on-device, locally at the robotic massage system. In other embodiments, the planning is distributed between on-device and remote backend.

The generated massage plan 432 is then passed to the massage plan executor 434 (e.g., massage plan executor 304). In some embodiments, the massage plan executor is configured to play the stroke paths in the massage plan either until completion, or until new user feedback, or a large-enough drift is detected. In some embodiments, new user feedback and detected drift are monitored for by massage monitor 306.

The new user feedback and/or detected drift is detected by and used as indications of whether replanning of the massage should be performed. For example massage replanner 436 is invoked. In some embodiments, massage replanner 436 is implemented by massage planner 302, and is invoked to adjust the current massage plan appropriately, resulting in a modified massage plan (for at least the remaining time in the session). The massage replanning may be performed on-device and/or at the backend.

The following are examples of scenarios that may cause significant plan alterations.
  Pausing of the massage due to member commands, safety triggers, etc.
  Having less time than the targeted length of time for a given massage (e.g., due to a late arrival of the member to their massage appointment).

In some embodiments, if a solution that satisfies member requests and goals/requirements and constraints of the massage is unable to be determined, the massage manager is configured to provide output, including information such as an alert. In some embodiments, the massage manager also provides opportunities for intervention to the member, another example of collaborative plan diagnosis.

In some embodiments, the massage planner is a distributed system. For example, there is a local massage planner local to the robotic massage system, and a massage planner in a remote backend. For example, massage planning is distributed across a backend entity (e.g., in the cloud) and a robotic massage device such as robotic device 100 of FIG. 1. For example, the initial massage planner 430 is implemented by a massage planner in the cloud, and the massage replanner 436 is implemented locally at the robotic massage system. In other embodiments, the massage planning and replanning are both performed in the cloud. In other embodiments, the massage planning and replanning are performed at the device.

Embodiments of Massage Planner Inputs

Inputs to the massage planner may be provided both prior to, and during massages. In some embodiments, the massage planner is configured to generate an initial plan using inputs received prior to the start of the massage. In some embodiments, the massage planner is also responsive to inputs received during the massage. In some embodiments, the massage planner is configured to perform adjustments, alterations, customizations, etc. based on received/monitored inputs, including detection of drift for various massage parameters. The following are further embodiments of massage planner inputs.

Embodiments of Member Inputs, Customizations, and Considerations

In some embodiments, the massage planner takes as input member preferences and goals to determine massage plans. The following are embodiments of various permutations of how members may interact with the system, and how the system responds to such member interactions. The interactions include both pre-massage member inputs and during-massage member inputs.

The member inputs can be provided via various different types of interfaces, such as via buttons, a touchscreen interface, voice commands, etc. The massage manager is configured to monitor for the user's feedback, parse the member's inputs, and provide appropriate instructions to the massage planner, such that the massage planner generates a massage plan customized to the member's preferences and goals.

In some embodiments, inputs from the members include:
1. A length of massage L (e.g., 30 minutes)
2. Focus areas (regions), along with target time and/or target intensity (e.g., high intensity work on glutes)
3. Sensitive areas (regions) to avoid or with lower target intensity.

Pre-Massage

In some embodiments, prior to the start of the massage, the member is permitted to provide inputs indicating their member preferences and goals. For example, the member provides overall parameters for the massage, such as a temporal length of the massage to be performed, the overall type of massage to be performed, as well as the general coverage regions of the massage to be performed.

The member is also provided with selectable options to provide more granular commands, such as with respect to specific targeted body regions. For example, the user is permitted to specify specific regions or areas of the body to spend more time on or less time on. The user is permitted to specify specific regions or areas of their body to avoid. The user is also permitted to specify the amount of intensity to apply to specific regions (e.g., lower intensity or greater intensity). Combinations of parameters for specific regions of the body may also be provided.

The following are further examples of pre-massage initial member preferences that may be provided. In some embodiments, pre-massage, the massage planner is configured to generate an initial plan by performing selection and sequencing/ordering of content based on the initial member preferences and targeted regions.
1. "30 minute full body massage"—this may be a nominal case, for example. In the following examples, 30 minutes is a nominal massage time length. Other time lengths may be utilized as appropriate.
2. "30 min full body massage, extra time spent on my lower back"—this is an example of a variation on the above nominal case. The planner is configured to allocate extra time in the lower back, while potentially reducing time in other regions.
3. "30 minute full body massage, avoid my lower back"-in some embodiments, the planner is configured to reallocate time that had been allocated to the lower back (as the user has indicated this is a region to avoid) to other regions to improve member experience.
4. "30 minute massage, only back and shoulders"-in this example, a nominal target length of time is specified by the user, but with a smaller coverage area (as compared to a full body massage, where all regions of the body are to be covered by the massage).
5. "15 minute full body massage"-lesser amount of massage time, but full coverage requested—in some embodiments, the massage planner is configured to budget less time per region.
6. "30 minutes of compressions on back"-in this example, the member input includes specifications of more specific types of work (compressions) on the region to be covered (back region). In this example, the member has provided fine-grained input. As shown in these examples, specifications of coverage regions, avoidance regions, and types of work to be performed (and where) may be provided at various levels of granularity.
7. "30 minutes full body massage, extra focus on left calf since that is sore"-a nominal target massage time length is specified. The user has requested additional focus on a specific region-left calf in this case. In this example, the massage planner generates a massage plan with instructions that cause the robotic arm that interacts with the left calf to take a different approach than the other robotic arm.

During-Massage

As described above, in some embodiments, during the massage, the member is provided the option to provide feedback that includes various types of reactions to the current state of the massage (e.g., where the robotic arms currently are, the type of work currently being performed, which section the massage is currently in, etc.). For example, the user can provide feedback based on what is being executed by the robotic massage system. The following are example types of member inputs that may be provided during a massage. In some embodiments, the massage planner is configured to perform restructuring of the massage plan (e.g., for the remaining time left in the massage) responsive to the user's feedback and the current state of the massage.
1. "More like this"-in some embodiments, the massage planner is configured to repeat the current strokes/variations. In some embodiments, to account for the increased amount of time needed to repeat the current strokes/variations, the massage planner is configured to deduct time from the remaining portions of the massage plan.
2. "Less like this"-in some embodiments, the massage planner is configured to replace the current stroke with dissimilar strokes in the same region. In some embodiments, the massage planner is configured to allocate additional time in other regions.

In some embodiments, the user can also specify "that feels good" or "that doesn't feel good." In this way, beyond indicating that they want more or less of certain types of strokes, users can also specify whether they like or dislike the manner in which a stroke is being performed. Such user input provided during a massage can be used as feedback for reinforcement learning algorithms.
3. "Skip to the next section" or "move on"-in some embodiments, in response to the member requesting to skip the current section of the massage and move to the next section, the massage planner is configured to re-budget the remaining time among the remaining massage sections. In other embodiments, the lost time is not reallocated.
4. "Nudges"—in some embodiments, in response to the member requesting to nudge where the arm(s) is/are currently interacting with the member, the massage planner is configured to replace the current stroke with a minor shift/variation.
5. "Focused Work"—in some embodiments, the massage planner is configured to perform targeted work on the current location (e.g., location or position on user's body) that the robotic system is currently operating on (at the time of the member request to provide further focused work). In some embodiments, this is both pre-planned in the overall massage, and available for members to trigger in any location at any point during the massage.
6. "Sensitive Areas"—in some embodiments, when a member finds an area during the massage they do not want to focus on (and had not requested to avoid pre-massage), the massage planner is configured to, in response to the user's input, reduce the intensity of content played in that area.

7. "Intensity"—in some embodiments, the planner is configured to determine what massage content is played based on a desired intensity of the massage. In some embodiments, massage strokes are associated with intensity metadata indicating the (range of) intensity that the massage stroke operates at. Whether the massage content is selected for inclusion in the massage plan may be based on an amount of match between the intensity metadata of the massage stroke and the indicated desired member intensity.

In some embodiments, the sequenced selection of strokes that is performed on the subject is a subset of what could be performed. The massage planner is configured to select what subset of strokes to play, and their ordering. In some embodiments, when a user provides feedback, adjustment of certain parameters is facilitated, where the adjustments that can be made are subject to a set of constraints, such as maximum pressure constraints, progression constraints (where some strokes cannot follow other strokes), etc. In some embodiments, the mapping or interpretation of user inputs to selection/sequencing of strokes according to constraints is facilitated by the metadata used to tag the strokes in a library of strokes.

Body Model

Figure 5A:
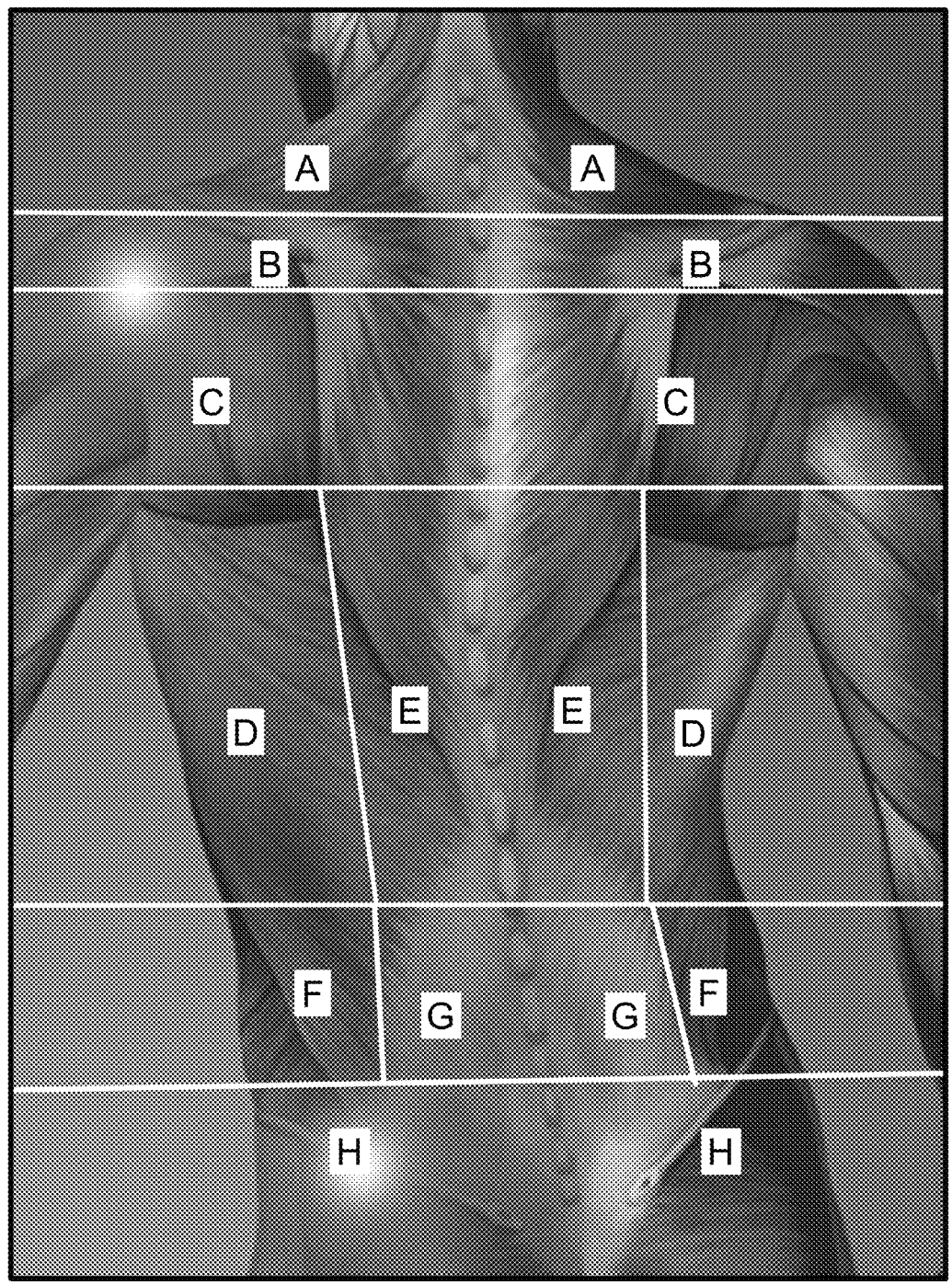
FIG. 5A illustrates an embodiment of a body model.

As described above, another example input to massage planning is a model of the subject's body. FIG. 5A illustrates an embodiment of a body model. In this example, a member's massage surface (their body) is divided into a set of regions (indicated by labels "A", "B", "C", "D", "E", "F", "G", and "H" in this example, and mirrored across the user's spine). In some embodiments, each region represents a section of the overall massage experience. In some embodiments, the massage planner is configured to determine a massage that covers all of the desired regions within a time budget, while factoring in specific member goals.

In various embodiments, the member's body is represented at multiple different levels, including:
region-based
feature-based (e.g., muscle, spine, bone, etc.)
mesh-based—in some embodiments, the body is modeled using a mesh representation. This is an example of a granular representation or model of the body that facilitates fine-grained stroke adjustments.

The above layers are not mutually exclusive. For example, a feature-based model can have a mapping of features to triangles in a mesh.

The following is an example of utilizing the body model of the user to generate a personalized massage plan. In some embodiments, the body model is parameterized. The parameters of the body model are compared against information corresponding to massage strokes and their stroke paths, and used to determine which strokes to include or exclude from a massage plan. For example, the parameters of the body model indicate a body type of the user. In some embodiments, the metadata for a massage stroke indicates its applicability to a body type. In some embodiments, strokes are represented in terms of a path on a mesh. In other embodiments, strokes are represented in terms of control policies with respect to anatomical features. This is analogous to what human therapists do. For example, the paths of some strokes may not be comfortable for some body types. Such stroke paths may then be excluded from the massage plan. Those strokes with stroke paths that best match the user's body type may be selected for inclusion in a massage plan. As another example, a single stroke may have multiple possible variations of stroke paths that can be selected from. In some embodiments, the stroke path variant best suited for the user's body type is selected for inclusion in the massage plan. For example, based on the user's body morphology, different stroke paths (paths that the robotic massage arm will implement) may be selected.

Stroke Paths and Stroke Path Library

The following are embodiments of stroke paths and a stroke path library. In some embodiments, the stroke path library includes stroke paths for both massage strokes and transitions. For example, the stroke paths include those that pertain to performing of actual massage strokes, and ones that transition from one massage stroke to another. Further details regarding transitions will be described below. In various embodiments, stroke paths are generated from recordings, automatically generated via motion planning, imitation learning, reinforcement learning, etc.

Figure 5B:
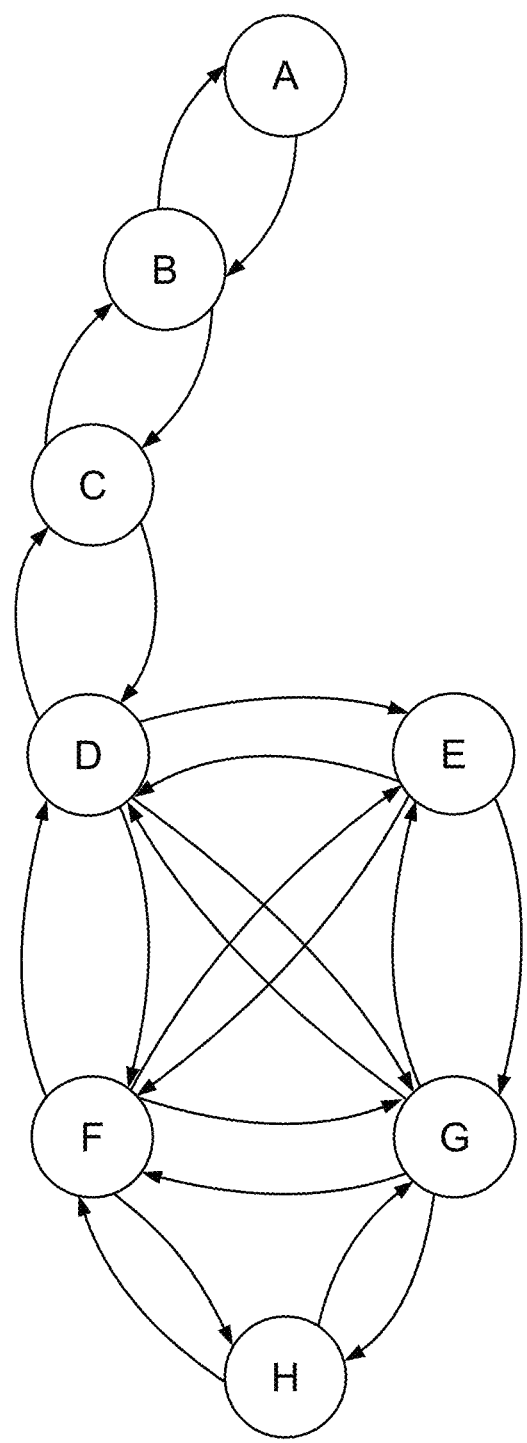
FIG. 5B illustrates an embodiment of stroke paths.

FIG. 5B illustrates an embodiment of stroke paths. In this example, maneuvering of the end effector of a robotic arm over regions of the body (e.g., for regions on the left-side of the spine, as shown in FIG. 5A) is shown. The maneuvering is automated via the sequenced selection of stroke paths (for both massage work and transitioning) in a massage plan executed by the robotic massage system, as described above.

In some embodiments, a massage plan is composed of a sequenced selection of massage strokes, where the strokes are maintained in a stroke library (e.g., massage content database 218).

In some embodiments, a stroke is a contact-rich trajectory executed by the end-effector on the massage surface. In some embodiments, each massage stroke is associated with metadata, where the stroke metadata is used to perform the selection and sequencing of massage strokes by, for example, facilitating determining of an alignment between member preferences/goals, constraints, and strokes (according to their metadata).

For example, in order to support selection and sequencing of strokes from a stroke library that is based on the aforementioned types of inputs, the strokes in the stroke library are tagged with associated or corresponding metadata. For example, the metadata that a stroke is tagged or otherwise associated with facilitates precise determination of specific strokes to include, as well as the order in the sequence that the strokes should be placed in. The tagging of the strokes in the stroke library allows for a searchable, full-picture physiological library of combined stroke, body area, technique, conditions, etc.

In some embodiments, from the perspective of the massage planner, a stroke s is represented by a corresponding set of metadata. As one example, a stroke is represented by the following tuple (id, region, type, duration, bc_ts), each of which are described in further detail below.
id: the stroke name, or identifier of the stroke in the stroke library/database.
region: localizes the stroke on the body model (shoulders, mid-back, etc.). For example, the region identifier indicates the area of the body that the end effector will come in contact with when playing or executing the stroke. The region identifier may also be used to determine further body information pertaining to the region, such as underlying muscle tissue, skeletal organ structure underneath the body area (e.g., to determine the structures under the skin), etc. Other examples of information pertaining to the body area or region include general population statistics such as the range of depth of certain tissues in the region. The region identifier can be used to match to user-specified region inputs.

type: is the kind of stroke (effleurage, stripping, etc.), beneficial in adhering to logic constraints (e.g., progression constraints, such as that a stripping stroke can only be done once effleurage is done). The type identifier can be used to match to user-specified desired types of work duration: time taken to execute the stroke (beneficial for estimating massage length). In some embodiments, the durations of strokes in a massage plan are used to facilitate the determination of how long the individual strokes that make up the massage plan, in aggregate, will take. The individual duration measures can also be used to determine how much time would be removed if the stroke were not included, or how much time would be added if the stroke were included in a massage plan.

bc_ts: in this example, this stands for "barycentric time series." This provides highly granular information at the trimesh level describing the trajectory of the end effector.

The following are further examples of metadata that can be associated with strokes.

intensity: in some embodiments, this metadata indicates an intensity level or range of intensity associated with the massage stroke. This can include user-perceived intensity of the stroke. This can also include minimum/maximum pressures for the stroke.

motion Type: One example type of motion is a massage stroke (e.g., to induce a therapeutic effect). Another example type of motion is a transition stroke, such as to transition from one stroke to another. Another example type of motion is self-transition motion.

segment identifier: identifier of a segment in a massage template. Further details regarding segments in a massage data model are described below.

segment description: user readable description of the massage segment.

operational metadata: such as whether the stroke is skippable. As will be described in further detail below, whether a stroke is skippable or not (e.g., is played) can be used to facilitate restructuring of massage plans. For example, if content that is designated as skippable is to be removed in order to satisfy timing requirements, then the content can be skipped over and not played.

physiological response: In some embodiments, this metadata indicates the intended physiological or therapeutic response of the massage stroke (e.g., increasing circulation, releasing fascia, clearing metabolites, etc.). In some embodiments, this metadata also includes indicated or contraindicated conditions for that physiological response. For example, suppose a massage stroke is indicated to increase circulation (physiological response). This physiological response is mapped to any contraindications, such as for people with severe edema. In some embodiments, the physiological response provoked by a massage stroke's motion is mapped or associated with specific body regions. For example, the same stroke motion in different regions may provoke different physiological responses.

related strokes: In some embodiments, this includes references to other strokes (that are for example determined or designated to be similar).

portion of end effector/touchpoint used: In some embodiments, the end effector is a multi-surface tool that includes multiple surfaces. In some embodiments, the individual surfaces are shaped to facilitate certain types of massage work. For example, the individual surfaces are shaped to emulate the effect of different parts of a masseuse's hand/arm for use in various massage work (e.g., knuckle, palm, blade of hand, elbow, etc.). In some embodiments, the metadata associated with a massage stroke includes an indication of the surface of the end effector that is utilized when performing the massage stroke.

linger permission: In some embodiments, this includes a flag to indicate whether lingering is permitted for the massage stroke.

nudge permission: In some embodiments, this includes a flag to indicate whether nudging of the massage stroke is permitted (e.g., to allow the user to perform fine grain adjustments of positioning/intensity of the end effector).

As shown above in the canonical physiological framework of the massage content library described herein, the metadata that strokes are tagged with facilitates translation of inputs and feedback into massage plan adaptations (which may involve selection and sequencing of strokes in accordance with the inputs). For example, if a user indicates a region to avoid, strokes that are tagged with the indicated region are not selected for inclusion in a massage plan. Further details regarding selection of massage content for inclusion (or exclusion) from a massage plan are further described below.

In some embodiments, the physiological framework comprises a physiological map. In some embodiments, the physiological map includes mappings of related or opposing muscle groups. In some embodiments, the physiological map also includes mappings of related sources of referred pain. For example, the robotic massage system described herein provides interfaces via which users can indicate body regions in which they have pain (and to also avoid, for example). Based on the physiological map, the robotic massage system is further configured to determine related pain areas. For example, if the subject indicates lower right back pain, using the physiological map, the robotic massage system also determines that it is likely that the subject also has left glute issues. In this way, the robotic massage system facilitates collaborative diagnosis. The determination of related physiological areas is further utilized by the robotic massage system to determine what stroke paths (which, as described above, are associated with metadata indicating the body region in which they operate, as well as the type of physiological response they provide) to include (or exclude) in a massage plan when determining how to provide treatment or therapeutic benefits to the subject. This further provides benefit to the subject, as users may have difficulty pinpointing sources of pain when self-diagnosing.

As described above, the adaptations performed to determine a massage are guided by inputs provided by the user. Examples of attributes that are taken into account when determining an optimal massage plan include adaptations for strokes according to pressure, intensity, tempo, regions (included and/or excluded), time (increased or decreased) in a particular body region, etc. Micro-position adjustments may also be made at the granularity of individual muscles. The balance of strokes included in the sequence may also be optimized according to the aforementioned massage attributes.

As described above, in some embodiments, the strokes are maintained in a stroke library. In some embodiments, the stroke library provides strokes to add to a massage plan, where the massage planner adds the provided strokes in a manner that respects logic and time constraints.

In some embodiments, strokes are parameterized (for example, with a start location and/or end location) that allows for executing variations of the same stroke type at different parts of a region. In some embodiments, the massage planner, as part of its optimization, determines such parameters.

As described above, an initial massage plan is generated from scratch in some embodiments. In other embodiments, an initial massage plan is generated from a starting curated massage. The following is an example of determining a massage plan using a starting curated massage (that already includes a sequence of strokes). In this example, the massage planner receives as input a curated massage M as well as a library of strokes S. In some embodiments, the massage planner is configured to downselect from M to optimize for member goals and session length, as well as to decide on the specific stroke paths to use for a given stroke. Further details regarding optimization of selection and sequencing of massage strokes to generate a massage plan are described above.

Transition Strokes

The following are further embodiments regarding transition strokes. In some embodiments, in addition to massage strokes, the stroke library also includes transition strokes. In some embodiments, transition strokes are generated automatically. In some embodiments transition strokes are strokes that are not implemented for a therapeutic impact, but to move the robotic arms/rail to the starting position of a next massage stroke (e.g., to transition from one massage stroke to another). This includes, for example, transitioning the robotic system to a new region.

While the overall massage experience may be defined primarily by the actual (non-transition) massage strokes, care should be taken with a transition stroke (path) so that they do not cause discomfort or lessen the user experience. In some embodiments, the massage planner makes transition strokes as short as possible, by optimal sequencing of the massage strokes.

The following are embodiments of implementing a transition stroke:
1. At the end of the previous stroke, stop and ramp down the force
   a. stopping may not be necessary, for example, if position and velocity are close in previous and successor strokes
2. At low force, transition the tool to a lower force surface (in some embodiments the end effector is a multi-surface tool, with different surfaces corresponding to different parts of a therapists hand/arm, such as thumb, elbow, palm, knuckle, blade of hand, etc., where the different surfaces may be used for different therapeutic purposes)
   a. At low force, if start and finish strokes have the same tool, transitioning need not be performed
3. At low force, glide from the end point of the previous stroke, in region 1, to the start point of the next stroke, in region 2; as one example, use a straight line path in X, Y
4. At low force, transition the tool to the new tool surface region (thumb, elbow, palm, etc.)
5. Ramp up the force to be consistent with the start of the next stroke
6. Start the next stroke In various embodiments, transition strokes are generated automatically, recorded, etc.

Default/Generic Priors

As described above, members are provided options to specify member preferences and goals at varying levels of granularity. For example, a user may specify that for a specific region, they would like massage work at a target intensity for a target amount of time.

In some cases, a user may not provide an input (and if the member is a new user, then there is potentially also no historical user information). The following are embodiments of default or generic priors/parameters that are utilized by the massage planner that are member-agnostic (e.g., that are applicable in the absence of more specific user inputs).
1. targetTimeBudget: in some embodiments, this is a function that maps regions to a suggested or default fraction of time spent in that region.
2. targetIntensity: in some embodiments, this is a function that maps regions to suggested or default average intensities of massage in a region.
3. minTime: in some embodiments, this is a function that maps regions to a minimum amount of time to spend in that region. This provides a lower bound for the massage planner to achieve in each region.

Further Embodiments Regarding Constraints

The following are further embodiments and details regarding constraints that define bounds on the structure of the massage plan (and, for example, what content can be included, and in what sequence).

Embodiments of Temporal Constraints

As described above, one example constraint that the massage plan should adhere to or obey is temporal constraints (e.g., so that the massage plan does not exceed an allotted session time). In some embodiments, massage content adaptation includes performing clock or time management responsive to user actions.

In some embodiments, an end time marker is set, indicating when massage session time ends. In some embodiments, the end time marker is a window or band of time to allow for buffer.

In some embodiments, to allow more granular adaptations or modifications to a massage plan, closing sections of the massage plan are composed of a number of short strokes. For example, the playing of a minimal number of short repetitions would, in aggregate, provide a conclusory experience to the massage, while also providing flexibility and granularity to tune the massage plan to end on a booking or session end time in a smooth (and not abrupt) manner.

The following are examples of massage replanning according to temporal constraints. Examples of temporal measurements or values of interest include time overall, time within (body) areas, time within certain types of content, etc. Such values are determined based on, for example, the metadata that strokes are tagged with. For example, the system keeps track of the time elapsed or spent for different labels (metadata tags). For example, if the system encounters a stroke that is tagged as being used for deep tissue massage, then the system logs the duration of the stroke as time spent on deep tissue. When another deep tissue stroke is played, the duration spent on the stroke is added to the timer for the deep tissue work. The time spent during certain types of work may also be inferred from other metadata associated with the strokes. For example, in some embodiments, strokes are tagged with metadata indicating what type of surface of the end effector is used to implement the stroke. If the effleurage surface of the end effector is being used, which is used for broader types of tissue work, then the duration of that stroke is not added to the measure of time elapsed for deep tissue work.

Embodiments of Progression Constraints

As described above, one example of constraints are temporal constraints (e.g., the amount of time available for the massage). Another type of constraint taken into consideration by the massage planner is progression constraints. Such progression constraints are also provided as input to the massage planner to determine how to select and/or sequence strokes.

In some embodiments, progressions are codified in the form of rules. For example, progression rules are specified to facilitate smooth and safe progression into high-intensity work by performing an appropriate level of prior warmup. One example of codifying progressions is to represent them as precedence constraints (e.g., that warmup is required before compression; that a cool down is required after any high-intensity stroke). Fine-grained temporal constraints may also be used to encode progressions (e.g., for every minute of high-intensity work, X minutes of warmup-type work are required to be performed).

As one example, pre-conditions, post conditions, control policies, and guard conditions associated with stroke paths are used to facilitate sequencing decisions. In some embodiments, the aforementioned conditions include representations of conditions with respect to ordering of content (e.g., strokes). For example, some strokes should not follow other certain strokes, or should not be performed prior to certain strokes. The specification of such conditions may be for a variety of reasons, such as protecting users (e.g., so that the user is not made uncomfortable due to the robotic arm jumping around playing strokes in different parts of the subject's body). For example, the set of conditions is used to enforce a level of progression. The progressions enforced include regional continuity of successive strokes, such that strokes progress from one region of the body to the next with minimal discontinuities.

As another example, the progressions include dependency conditions on the ordering or sequencing of the type of work to be performed. One example of such a progression dependency is that prior to a stroke for deep tissue work on a muscle, a warmup of the muscle should be performed first. In some embodiments, the requirement of strokes that warm up a muscle in advance of work on the muscle is encoded as a constraint.

In some embodiments, the conditions are determined from metadata associated with a stroke, such as that described above.

The following are further embodiments of selecting and sequencing massage strokes in a massage plan based on progression constraints. As described above, in various embodiments, strokes are labeled with various metadata that are used to determine their selection and ordering in the massage plan. In some embodiments, a stroke is labeled with metadata indicating whether the stroke is eligible for inclusion in a warmup or cool down section. For example, when determining a massage plan, a cool down section is aligned with an end marker. This prevents the massage from ending abruptly on high intensity work, which could provide a poor user experience. In some embodiments, strokes are tagged with metadata indicating their eligibility for placement at the starts and ends of massages (or massage segments or sections). One example constraint is that a section is required to start with a warmup stroke, and that a section ends with a cooldown stroke. As one example, such warmup and cool down strokes are placed at the beginning and the end of the massage, respectively, and are designated as unskippable. In this way, even if the massage plan is reordered or restructured due to updated user feedback/preferences, such warmup and cool down strokes are prevented from being removed. The following are further examples of massage planning according to user preferences and goals, as well as constraints. As described above, in some embodiments, massage planning involves determining a selection and ordering of strokes that satisfies overall constraints, such as being within an allotted amount of time, providing a desired amount of coverage of body areas, etc. In some embodiments, as part of the optimization, an amount of time to spend in areas while meeting overall conditions is determined. For example, if a user indicates that they would like to focus on a particular region and spend more time in that area, then the massage planner determines a ratio of time spent in the desired region as compared to other regions such that the user's objective of more time in the desired area is met, while also adhering to the overall allotted time constraint on the massage as a whole. In this example, the user's input indicating more time to be spent in a region is translated into a ratio in which a greater proportion of time is spent on the desired focus area. The absolute amount of time spent on specific strokes is then scaled according to the ratio/proportion and the allotted time constraints. In some embodiments, such user objectives or preferences are specified by users (e.g., prior to and/or during a massage). Such user objectives/preferences may also be learned from users' past massages.

As one example, performing massage planning includes determining a distribution of time spent across body regions involved in the massage plan. In some embodiments, an initial distribution is determined. Suppose that the user provides feedback. In some embodiments, replanning is performed to update the distribution of time spent in regions. In some embodiments, the amount of time to be spent in an area is used to determine what stroke or type of stroke to play. For example, if a user indicates that they would like more work to be done in a certain area, then the distribution of time is updated to include additional time in the desired area. To fill up the amount of time, in some embodiments, the system repeats the same stroke. As another example, a mapping is made to update to different types of content. In some embodiments, such updates are performed dynamically. This provides a form of translation between user-defined objectives and the strokes that are selected to be played and in what sequence.

In some embodiments, if a user's objectives cannot be satisfied without violating a constraint such as allotted time, the system is configured to indicate that the allotted time is insufficient and provide suggested actions. One example action is to allow the user to extend the time for the massage (schedule-permitting).

Embodiments of Segment Preservation Constraints

In some embodiments, another constraint or condition on the sequencing of content in a massage plan (e.g., when performing restructuring in response to drift) is preservation or maintaining of certain segments in the overall structure of the massage. This includes conditions to start the massage plan with an opening section, and to end with a closing section. As one example, when the massage planning is implemented as a constraints-based optimization problem that involves the solving of objective functions (further details of which are described below), these conditions are encoded (e.g., via heuristics or weights) in the objective function(s) to be optimized over.

As one example, suppose an initially-formulated massage plan. The massage plan is partitioned into segments, where each segment includes a corresponding set of strokes. Suppose that reordering is to be performed. In some embodiments, a constraint is determined such that reordering is limited to be between segments of strokes. For example, a constraint is defined that reordering based off of segments is permitted, but that strokes within a segment cannot be reordered. Having such segments and constraints on what intra-massage plan structures can be reordered can be leveraged to facilitate enforcing of certain progressions within a massage plan.

In some embodiments, the set of possible massage plans is represented as a graph. An individual massage plan is a path through this graph of candidate massage plans. In some embodiments, the massage planner searches the graph to compute a massage plan.

In one example in which a massage plan is represented as a path through the graph, nodes correspond to strokes, where there are directed edges between strokes. In some embodiments, the directed edges represent transitions from one segment to the next connected segment. In some embodiments, reordering includes determining new directed edges between segments. In some embodiments, the edges are implemented via transition strokes to move from the end of one segment to the start of the next connected segment.

In some embodiments, permitted directed edges between segments can be defined, where prohibition or exclusion of transitions between segments can also be defined. The definition of allowed and/or prohibited transitions between strokes is one example sequencing constraint. For example, to enforce segment preservation constraints, in some embodiments, with a segment structure, the strokes within a segment are fixed (and not allowed to be reordered). In some embodiments, removing of a stroke causes a segment that the stroke was in to be removed.

Example Massage Plan Model/Data Structure

The following are embodiments of a massage plan model and data structure. In some embodiments, a massage plan includes a mapping from a region to a sequence of strokes in that region. In some embodiments, a massage plan includes an ordered list of strokes or stroke paths (with additional related section information in some embodiments). Example massage plan data structure formats include HTNs (Hierarchical Task Networks), TPNs (Temporal Plan Networks), etc. In some embodiments, TPNs are used to automatically speed up remaining strokes if the massage falls behind. This can be accomplished without replanning.

Figure 6A:
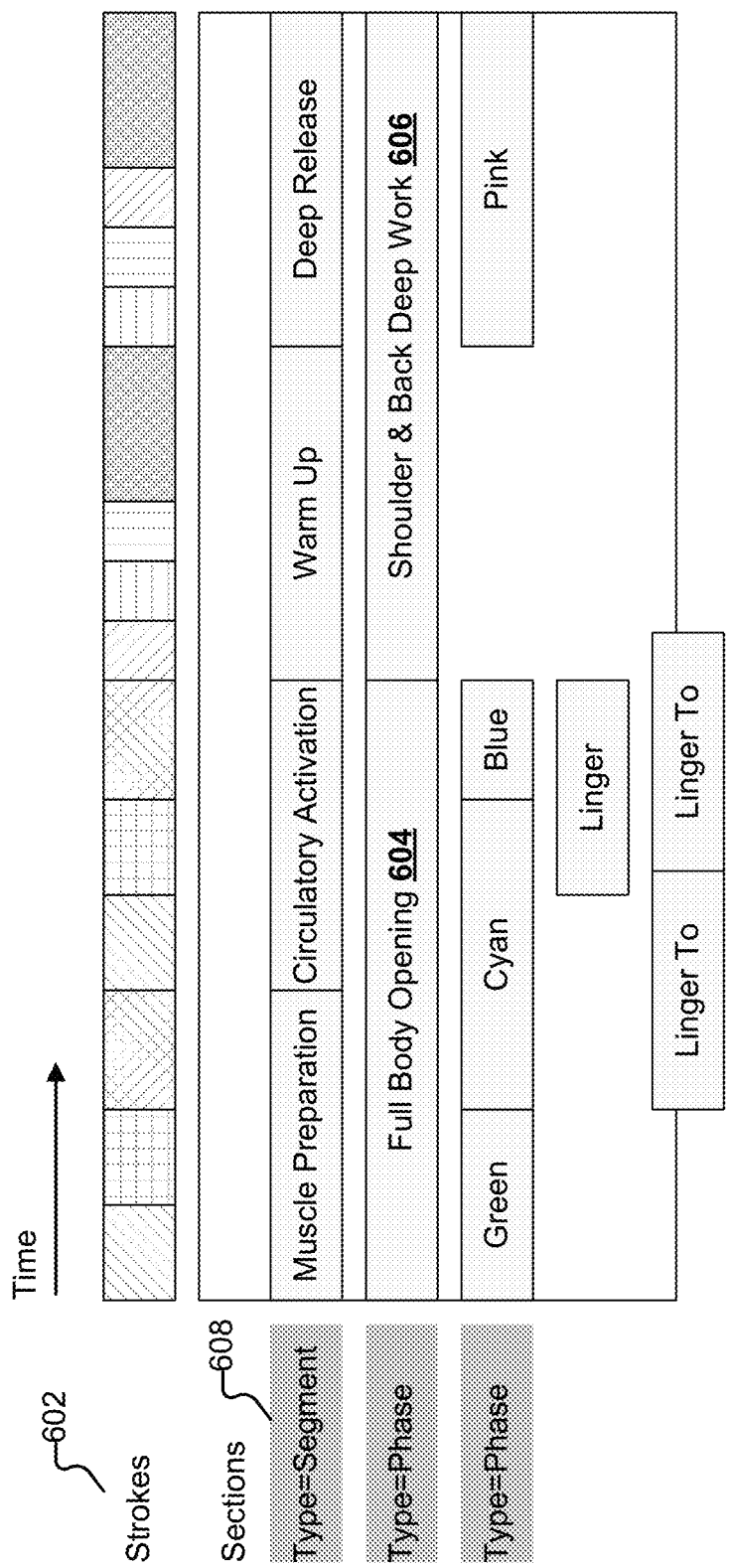
FIG. 6A illustrates an embodiment of a massage plan data model.

FIG. 6A illustrates an embodiment of a massage plan data model. In this example, a data model of a massage plan generated using massage planner 302 is shown. In this example, a massage plan data model showing a singular list of strokes with associated metadata held in sections is shown.

In this example, a massage is a timeline of strokes (602) arranged in a particular sequence. For example, one stroke is followed by another stroke, which is in turn followed by another stroke, and so on.

In this example, strokes with the same pattern correspond to the same stroke. As shown in this example, the massage may be divided into phases (e.g., full body opening 604, shoulder and back deep work 606 in this example), where each phase may be further divided into segments 608 (e.g., muscle preparation and circulatory activation segments within the full body opening phase). In some embodiments, the strokes are labeled with metadata (e.g., therapeutic effect, body region, etc.) that facilitates selection of and sequencing of strokes depending on segment/phases of massage.

In some embodiments, various other structures and controls are determined based on the timeline of sequenced strokes. For example, various layers or sections of data may be built on the sequenced set of strokes to facilitate triggering of various actions and responses. For example, the color of lighting (e.g., green, cyan, blue, pink) that is used, and when, may be triggered or controlled based on what massage stroke, segment, and/or phase is occurring. Further, the metadata associated with strokes may also control whether certain features are permitted, such as nudging.

As described above, transition strokes are also included in a massage model. For example, strokes are typically localized to a particular region of the body. In some embodiments, to move from one therapeutic stroke in one region to another therapeutic stroke in another region, transition strokes are included to move the robotic arm to the next part of the user's body on which the next therapeutic stroke is to be played.

Figure 6B:
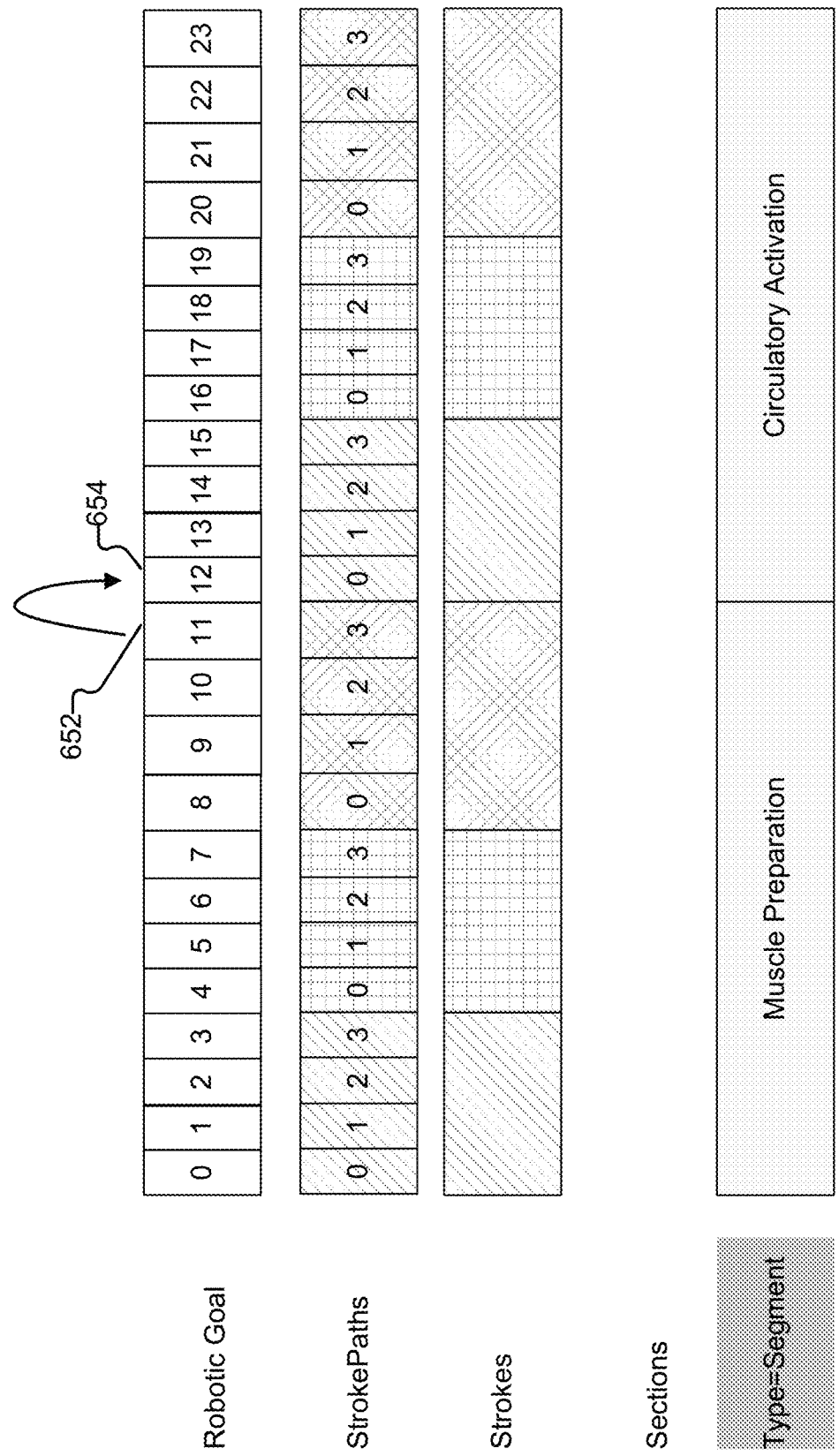
FIG. 6B illustrates an embodiment of execution of a massage plan data model.

FIG. 6B illustrates an embodiment of execution of a massage plan data model. In this example, execution of a portion of the massage plan shown in FIG. 6A is shown. In some embodiments, the massage plan is executed by massage plan executor 304 of FIG. 3.

Shown in the example massage plan data model of FIG. 6B are executable stroke paths that are loaded based on strokes and section information being emitted based on goal indices with the massage plan. For example, for each stroke in the massage plan, a stroke path is selected (and adapted according to a subject's body morphology, as determined according to a body model) defining a trajectory of the end effector when implementing the stroke (where a stroke may be associated with multiple variations of a stroke, for different body morphologies for example). For example, a stroke path is selected based on the scanned body model of the user. In some embodiments, the stroke path is transformed into an executable stroke path that includes a sequence of robotic goals to be played for the particular member.

In this example, each stroke path is defined as a series of robotic goals. Each robotic goal defines or specifies a set of coordinates (e.g., X, Y, Z three-dimensional coordinates) defining a particular location on the subject's body, as well as a force to apply to that location. The robotic arm, when implementing a stroke path, plays each goal in succession. This includes moving (e.g., via torque commands) the robotic arm's end effector to be at the coordinates specified by the robotic goal (e.g., specifying a robotic arm pose or joint configuration), and then applying the amount of force/pressure specified by the robotic goal at that location specified by the coordinates.

In this example, linear execution of a massage plan is shown. In this example, goals are played sequentially, in order. In some embodiments, playback of a goal is reported as an event. In some embodiments, new section events are emitted based on edges crossed. For example, suppose an initial state at Robotic Goal 11 (652), where Robotic Goal 12 (654) is then played. Based on the crossing of the edge from Goal 11 to Goal 12, the following events are emitted: end muscle preparation; start circulatory activation. In some embodiments, the emitted events are metadata that are tied to sections, segments, etc. In some embodiments, the emitting of events is based on goal indices. As another example, emitting of events is based on timestamps.

Massage Restructuring

The following are further embodiments of restructuring or replanning of massage plans.

Detecting Drift

In some embodiments, massage plan restructuring is performed or triggered in response to detecting drift. This includes detecting deviations from goals or constraints that were set for the current massage plan (that is to be restructured). For example, a massage plan is generated with respect to a set of goals/constraints including, in various embodiments, coverage goals/constraints, temporal goals/constraints, and therapeutic impact goals/constraints.

In some embodiments, for a given massage plan, the coverage, temporal, and therapeutic impact goals are associated with bounds. Deviations are detected when it is determined that execution of the massage plan will drift beyond these bounds.

The following are embodiments of assigning bounds to massage plan goals/constraints (where the bounds are a form of encoding constraints on the goals).

One example type of bounding is temporal bounding. For example, consider coverage. Suppose that the user has requested a set of body areas to be covered by the massage, with more work to be done in some areas than others. In some embodiments, each region within the set of regions to be covered is associated with a corresponding temporal bound, such as a minimum amount of time that must be spent within the region, and/or a maximum amount of time that can be spent in the region. In some embodiments, there are inter-relationships specified between user goals/preferences.

For example, suppose that a user specified that they would like a full body massage, and that today they would like the massage to particularly focus on their upper back. The user need not specify a specific amount of time. Instead, the system infers times based on the user's input. For example, the system assigns min-max default values or ranges to different regions based on the user's preferences. For example, for some regions, the min-max ranges can be initially set to be between 4 and 20 minutes, with a default of 10 minutes. Such ranges provide bounds for detecting when execution of the massage plan is drifting outside of the parameters of the initial or current plan. In some embodiments, such bounds or limits are defined with respect to what has been configured in the initial planning stage. The bounds or limits may be determined based on input from an expert (e.g., therapist when they create a curated massage). The limits may also be based off what the massage subject explicitly provides as input. For example, the user may indicate that they would like 20 minutes of massage work in a certain region. In some embodiments, the boundary is determined as a percentage of the user-specified amount of time.

In other embodiments, the bounds or range of time specified for a region is based off of a relationship with allotted session time for the massage, such as a percentage of the overall massage time. For example, 20% of the time may be allocated to performing a certain type of work or operating in a certain region. Determining allotments of time to components of massage work as a percentage or proportion or function of overall massage session time allows adaptation of component time even if the session time changes. For example, the session time may change if the user is late to their session, reducing the total amount of time until their session ends (which may be fixed). In this case, while the amount of available session time is reduced, the proportion of certain types of content is maintained, with the absolute amounts of time spent for certain types of content scaled appropriately according to the available amount of session time.

The following are further embodiments regarding detecting drift and triggering massage plan restructuring in response to detected drift.

In some embodiments, the executor of the massage plan (e.g., massage plan executor 304) is configured to execute each stroke. In some embodiments a massage monitor (e.g., massage monitor 306) is configured to monitor each stroke. In some embodiments, the massage monitor is configured to detect whether drift and/or changes to member goals have occurred. For example, with respect to temporal drift, the massage monitor is configured to monitor the amount of session time remaining, as well as the amount of massage content time remaining. If the amount of massage content time remaining exceeds the amount of session time remaining, then a deviation or drift has been detected in the massage. Restructuring of the massage plan is then triggered.

In some embodiments, information pertaining to objectives and preferences is determined. Drift against constraints is monitored. Time is one example constraint against which drift is monitored. Another example of a constraint for which drift is monitored is force. For example, suppose that initially a user indicates a preference to have the massage run at a very low force. Based on this user preference, the massage planner prioritizes (or, for example, rewards, in a framework in which solving objective functions is optimized, as will be described in further detail below) the selection of strokes that are lower in intensity. However, suppose that during the massage, the user indicates that they would like to perform deep tissue work. The user preference for deep tissue work may be incompatible with the user's initial desire for low force or pressure, as low force when performing strokes corresponding to deep tissue work may result in low therapeutic impact. In this case, one or more of the user preferences or objectives may not be able to be met. In some embodiments, the massage planner is configured to not necessarily re-plan the massage, but provide an entirely different massage given the updated preferences. For example, the user can be notified that in response to deviation or drift from initial objectives and constraints, a new massage will be generated given the updated preferences. This is another example human-robot interaction.

The following is another example of performing massage plan restructuring. In this example, restructuring is triggered in response to user feedback indicating a region of their body to avoid (e.g., due to injury). For example, suppose that the plan executor is executing a stroke performed on the user's back. During operation of the stroke, the user indicates that the stroke has interacted with a region of an area that they would now like to avoid work on. In some embodiments, in response to the user feedback, the massage planner is configured to update or modify the remaining portion of the plan to remove the individual strokes that affect the specific user indicated area, while still allowing the massage to provide coverage of the region as a whole. For example, the massage planner performs restructuring in a manner that retains regions preferences while matching therapeutic intent, which includes removing strokes from a segment while retaining the original ordering of components or strokes remaining in the segment, while also enforcing some minimum amount of required work (e.g., needed to warm up the muscles before the segment).

In the above example, restructuring the massage plan includes removing (or preventing from playing) strokes in the massage plan in response to user feedback to now avoid certain regions. In some embodiments, skipping or removing a stroke includes generating and adding a transition stroke between the two strokes surrounding the now-removed stroke. For example, suppose the following portion in the original sequence, with massage-type strokes S(i−1), S(i), and S(i+1). The stroke at index i, S(i), is to be removed. Previously, there was a transition type stroke included in the sequence to connect from S(i−1) to S(i), and another transition type stroke to connect from S(i) to S(i+1). In this example, S(i) is to be removed. In order to connect the strokes S(i−1) to S(i+1), a new transition stroke is generated that connects the end of S(i−1) to the start of S(i+1). In some embodiments, additional time is budgeted in the original massage plan to allow for such replanning and introduction of new transition strokes. In some embodiments, the use of such buffers facilitates risk-aware optimization. In this case, the risk is the risk of running late. For example, it is not known beforehand all possible transition strokes that may need to be implemented in response to potential deviations or drifts or updated user feedback. Accordingly, an amount of temporal buffer is included in the overall time planning to allow for dynamic changes in connections between strokes (and dynamic determination of transition strokes). While all possible connections between all possible strokes in a massage plan could be pre-generated, this could become time-consuming or inefficient. In other embodiments, all possible connections between strokes (and the transition strokes to go between any two strokes in the sequence) are pre-generated (e.g., offline in the cloud).

In order to facilitate such dynamic restructuring (dynamic connecting of massage strokes), in some embodiments, the restructuring process is implemented as framework for solving a two-stage problem that includes solving a selection problem, and then performing a second stage of refinement and ordering, where the ordering includes building relationships between the components determined in the baseline selection (further details regarding such a two-stage framework are described below). In some embodiments, transition strokes are generated as relationships between massage strokes connected by the transition strokes. If two massage strokes do not connect (e.g., one does not immediately follow the other stroke on the subject's body when played in sequence), then a transition stroke is dynamically generated to allow the robotic arm to travel from the location on the user's body of the end of one stroke to the location on the user's body of the start of the next stroke. This is an example of an adaptation performed by the system if two massage strokes next to each other in the sequence are not otherwise connected. For example, the last point or position of one stroke is checked to see whether it is adjacent to the position of the start of the next stroke in the sequence. For example, it is determined whether movement between the end point of the previous stroke and the start point of the next stroke would have a continuous acceleration profile, or would otherwise be within bound for what is allowed between individual robotic goals. In some embodiments, a database is maintained that holds information on what strokes connect with what other strokes.

Dynamic Massage Plan Reconfiguration Using Surplus Content

As described above, a massage is monitored. In response to drift in constraints or updated member preferences, the massage planner is invoked to perform restructuring of the remaining massage session.

In some embodiments, restructuring a massage plan includes performing removal and inserting of massage content into what is to be executed. In some embodiments, inserted content to be executed is selected from a pool of candidate content. In some embodiments, the candidate content pool is a surplus pool of content that is included in the massage plan. For example, the massage plan, when generated, includes content designated for execution (e.g., initial massage plan), as well as content designated or otherwise indicated as surplus content to facilitate any massage plan adaptations that may be performed during the massage session.

As one example, the extra or surplus content is designated or tagged as skippable. The massage plan executor is configured to skip playing of stroke paths designated as skippable (and are designated as to be skipped). In some embodiments, when performing massage replanning, new pieces of content to include in the updated massage plan are selected from the extra content. For example, suppose that there is half an hour (30 minutes) of massage content remaining to be played, but there is only 25 minutes left of allotted massage time. Based on there being more remaining content time than remaining massage time, in some embodiments, the massage planner system is configured to determine one or more massage stroke paths to skip (e.g., to look ahead in the sequence and determine what pieces of skippable content to designate as to be skipped, and then designate the selected content as to be skipped). As another example, if there is insufficient time remaining to play all of the remaining content, and some of the massage strokes are repeated (e.g., are to be played for some number of repetitions), the massage planner adjusts the plan such that only the minimum number of repetitions of all remaining strokes is played.

Some content may not be prohibited from being made skippable (e.g., certain transition strokes). In some embodiments, what content is permitted to be designated as skippable is context-dependent. For example, while focused deep work in remaining sections may be permitted for removal (skipping), muscle warmup strokes may be prohibited from removal. In some embodiments, rather than removing a muscle warmup stroke, the entire segment that the muscle warmup stroke is included in is considered for removal. In some embodiments, and as will be described in further detail below, the replanning involves solving a constraint-based optimization problem, where one constraint is the skippability of pieces of content (which may be indicated as massage stroke metadata).

In some embodiments, the removal of different types of content is prioritized. For example, removal of a first type of content is attempted. If the time difference cannot be made up, then a second type of content is attempted to be removed. In some embodiments, the constraint-based optimization problem is solved based on priority ordering of what massage strokes are allowed to be removed. In some embodiments, what content is skipped or added is based on therapeutic impact. For example, certain progressions may be enforced to maximize therapeutic impact (e.g., to avoid overworking muscles or causing bruising or resulting in other counterproductive effects).

The following are further embodiments regarding surplus content. As one example, there is a full set of content in the library (set A)—a subset of that is considered when planning a massage (set B)—of which the massage contains the selected content (set C). In some embodiments, the surplus is the set of content remaining in set B.

One example in which the content that is not in set B is used is if someone pays for a massage extension (e.g., 15 min more) which can be implemented as effectively as a secondary curated massage.

Figure 7:
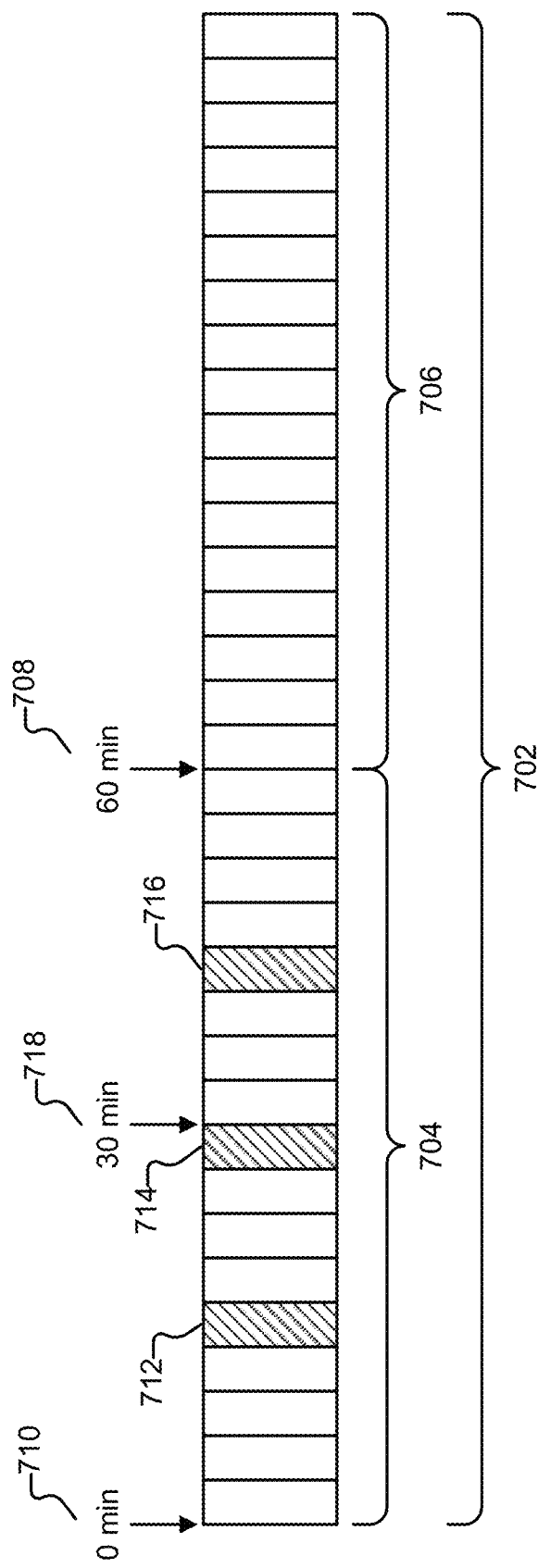
FIG. 7 illustrates an embodiment of dynamic massage replanning and
customization.

FIG. 7 illustrates an embodiment of dynamic massage replanning and customization. Shown in this example is a listing of strokes. In this example, the listing/sequence 702 represents all of the content that is being planned over/can be planned over. As one example, the sequence 702 is down-selected from all candidate strokes available in a stroke library.

Suppose an index at 708 representing the 60-minute mark for the massage (representing the allotted session time), with index 710 representing the starting or zero-minute mark for the massage session. Suppose that the 60-minute portion 704 of the sequence of strokes is the initial massage plan. Portion 706 represents an additional surplus of content.

Referring to the 60-minute portion 704 (which the massage executor determines robotic goals from to send to the hardware controller), suppose that the grayed-out portions 712, 714, and 716 are strokes within segments of content that are designated as skippable, and are currently set to be skipped (and are not being played). For example, as the executor executes the 60-minute portion of the massage plan, from the starting point, the executor does not select the grayed-out strokes for execution. Instead, the executor skips over those strokes. In this example, even with the "dead zones" of the grayed-out strokes, portion 704 of the massage plan is still effectively 60 minutes.

Now suppose that the user indicates, mid-massage, that they would like more of certain types of content, and less of other types of content. This user indication is mapped to a change in the massage plan. For example, the user input is mapped to a set of actions that includes setting skipped content to now be unskipped (and thus played) and removing another stroke by designating it as to be skipped. That is, in this example, fulfilling the user input includes designating some strokes as to be skipped, and designating other strokes as to be played (e.g., by setting previously skipped content to now be unskipped in response to the user's inputs or commands). Once the initial plan is generated, as described above, blocks of strokes may also be reordered. One example generalization of this is flexible plans, where the executive can make runtime decisions that change what is being executed, without performing. Plan representations, such as RMPL, can be utilized for such a purpose.

Another example of replanning includes adding, substituting, or removing one chunk of content in the previous version of the plan and replacing it with a chunk of content selected from the surplus portion. For example, suppose that the massage is at the 30-minute mark 718 and the content in the massage plan prior to the 30-minute mark has been played. Having surplus content provides flexibility in which the surplus content is a resource from which content can be pulled from to facilitate replanning.

Having surplus content as a resource allows varying levels of customization and personalization when performing replanning. For example, larger replanning is facilitated by having a larger set of content to draw from. In the example of FIG. 7, the reordering of massage content involved the designating of content within the allotted time as skippable or unskippable. Such adaptation of massage plans via altering designations of content skip/unskip states facilitates smaller deviations from the previous versions of a massage plan. Thus, the use of surplus content and individual control of skippability of strokes allows deviations or restructuring at various levels of granularity.

In the above example, the initial massage plan includes a set of strokes to be played in an allotted time, as well as surplus content that includes additional backup content that is provided along with the massage plan, that is usable as a pool of content from which to perform replanning. In some embodiments, the surplus content is maintained locally at the massage system (where the massage strokes are executed). By storing the surplus content locally, the robotic massage system need not pull content from a backend over a network such as the Internet. Re-planning is then performed over the entirety of the remainder of the allotted time by either taking out and/or pulling in content.

In the above example, the reselection of content is performed from surplus content included with the initial plan determination. In other embodiments, reselection is performed from the stroke library that contains all available strokes.

Embodiments of Sequencing and Selection of Massage Strokes

Figure 8:
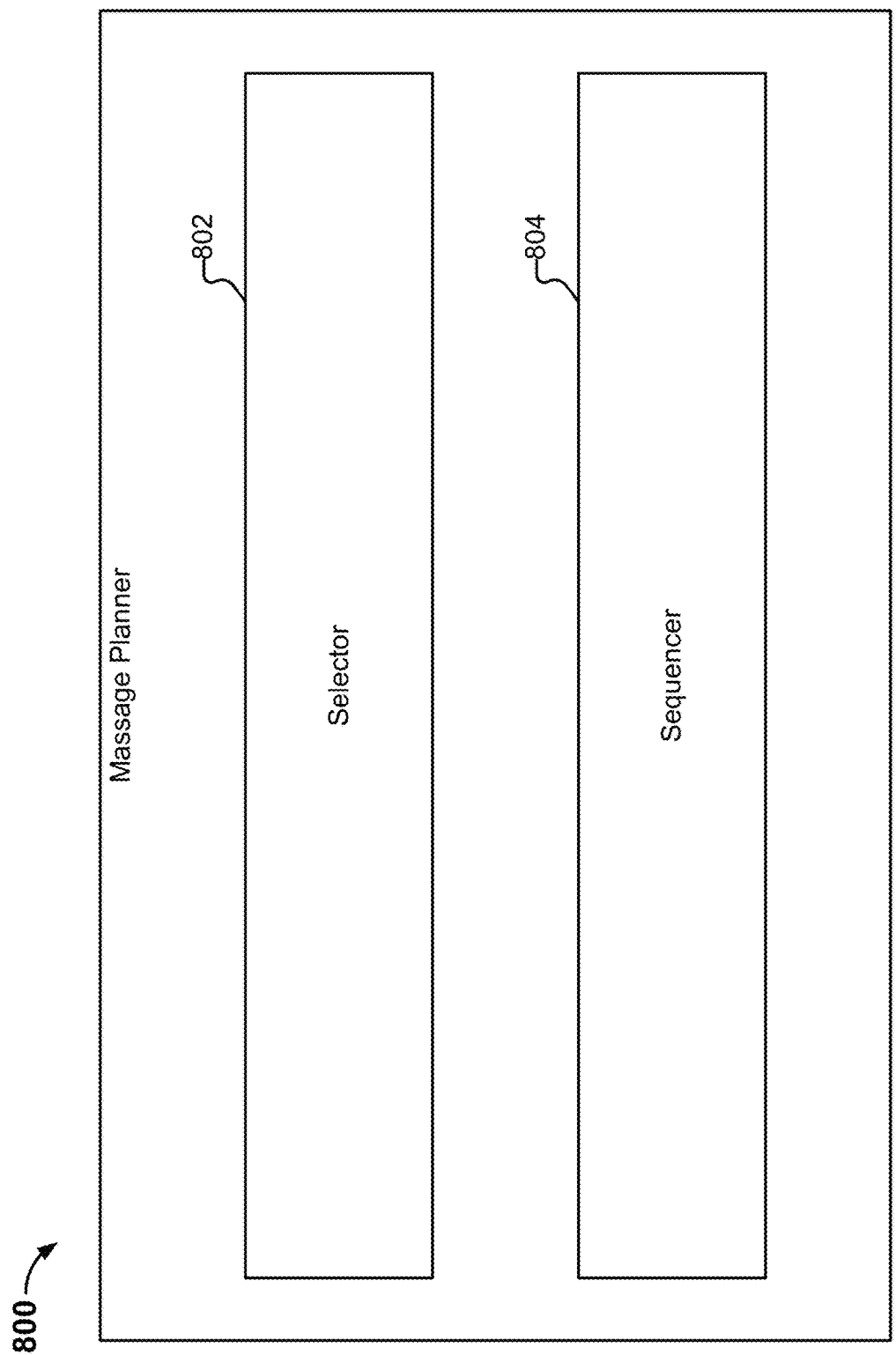
FIG. 8 illustrates an embodiment of a massage planner.

FIG. 8 illustrates an embodiment of a massage planner. In some embodiments, planner 800 is an example of massage planner 302 of FIG. 3. In this example, the massage planner includes selector 802 and sequencer 804. In the embodiment of FIG. 8, massage planning is implemented in a selection-sequencing framework.

For example, the massage planner is implemented as a framework for solving a two-stage problem that includes solving a selection problem, and then performing a second stage of refinement and ordering, where the ordering includes building relationships between the components determined in the baseline selection.

In some embodiments, the selection problem is solved (e.g., by selector 802) according to constraints such as a knapsack constraint, where there is a knapsack with a certain capacity (allotted session time), and the highest value content that fits within that capacity constraint is to be determined. In some embodiments, the massage content sequencing problem is solved (e.g., by sequencer 804) as a version of the traveling salesperson problem. In this example, what is to be visited is massage content in a specific order that results in an optimal score or value. In some embodiments, the selection and sequencing problems are solved independently. In other embodiments, the selection and sequencing problems are solved jointly. In other embodiments, the selection and sequencing problems are solved iteratively (e.g., selection, then sequencing, then re-selection, then re-sequencing, etc.).

In some embodiments, solving the sequencing problem (e.g., by sequencer 804) takes into consideration the amount of distance to be traveled between the end of one stroke and the start of another. For example, movement of the robotic arm to transition between strokes takes an amount of time in which no work is performed. In some embodiments, solving the sequencing problem includes minimizing the amount of transition that is to be performed, such that content is sequenced so that end points and starting points are closer together (or more closely aligned, to prevent long transition strokes).

As another example with respect to sequencing, one example objective that is optimized for is to maximize the amount of time in which massage content or work is performed. In some embodiments, the optimization is performed by rewarding performing of massage strokes and/or penalizing performing of non-massage strokes, such as transition strokes (during which massage work is not being done). As one example, the performing of massage strokes is assigned a reward or value in the objective function. A transition or motion-type stroke to move between massage content is given a zero-value for that time. For example, transition strokes are assigned values or weights that indicate that they are of lesser value compared to massage-type strokes. These values include therapeutic value measures that indicate the stroke's therapeutic value. For example, transition strokes are not used to perform work, and are assigned a value indicating that they do not have therapeutic value. In some embodiments, the sequencing objective function is optimized to maximize the amount of time in which massage work is performed, or to minimize the amount of time in which non-massage work (e.g., transition strokes) is performed. For example, given a selected set of massage work, a candidate sequencing of the selected massage work is determined. As part of the massage work, transition strokes between massage strokes in the candidate sequence are also determined. For each massage stroke and transition stroke, the amount of time to perform the stroke is determined. A value for the massage stroke is also determined based on whether the stroke is a massage stroke or a transition stroke. In some embodiments, the aggregate amount of time spent performing massage work is performed. The aggregate amount of time spent performing non-massage strokes is also determined. The amounts of time are used to determine a score for the sequence. Between two candidate sequenced selections of strokes, the candidate massage plan with the higher score is indicative of having more higher value massage work.

In some embodiments, to facilitate a smooth sequence of strokes (so that the sequencing of strokes feels natural to the user), the transitions are scored not only based on their efficiency (e.g., amount of time spent to perform the transition), but also scored based on a measure of naturalness. There can be various types of hard and soft sequencing constraints (such as warm-up constraints, for example). This includes scoring the manner in which the sequence of strokes progresses. For example, while a candidate sequence of strokes may score highly with respect to the scoring function (e.g., is efficient with respect to maximizing massage content time), it may not progress in a manner that is natural for the user.

In some embodiments, the optimization solver finds an optimal solution that observes the constraints, if one exists. In some embodiments, the sequencing and selection problems are solved simultaneously. In other embodiments, the sequencing problem and the selection problem are decoupled. For example, a set of content is first selected. That selected set of content is then sequenced. For example, an optimal sequence for the selected set of content is determined (e.g., according to user preferences), which is then evaluated to determine whether the sequence violates any constraints. If the sequence violates any constraints, the content is modified and/or re-sequenced again. For example, suppose that an optimal sequence of a set of content exceeds a session time constraint (e.g., exceeds the allowed amount of session time by three minutes). As the content exceeds the allotted session time, an amount of content that adds up to the deviation is removed. After the three minutes of content is removed, it is again evaluated against constraints to determine whether any were violated. If no constraints are violated, then the optimal sequence of selected content is then outputted as the optimal massage plan given user preferences and constraints. In some embodiments, the aggregate amount of time needed for a given candidate sequence includes both the amount of time performing massage content, as well as the amount of time needed to perform transitions. This total amount of time is then used to determine whether the candidate sequence exceeds the allocated session time constraint.

In one embodiment of the massage planner, the massage planner is implemented as a constrained optimization solver, where the massage planner determines a massage planner by solving an objective function. For example, the massage planner performs optimization to determine a massage plan that meets member preferences and goals while also satisfying constraints (e.g., temporal and progression constraints). As one example, the massage planner is implemented or modeled as a mixed-integer linear program to optimize the objective function while respecting certain rules (which are for example modeled as constraints). Other algorithms, such as local neighborhood search algorithms, can also be utilized.

The following are further embodiments regarding performing massage planning by performing constraints-based optimization. As described above, examples of inputs from the member include:
1. Length of massage L
2. Focus areas and target intensity
3. Sensitive areas to avoid entirely or be more gentle on The above example input data captures user's preferences and constraints. In some embodiments, the massage planner is implemented as a search-based solver for constrained optimization problems that takes in the above inputs.

In some embodiments, the focus/sensitive areas are optional inputs from the member. For example, the user may specify that they would, overall, like to have a basic relaxation massage. In some embodiments, in the absence of member input pertaining to specific focus/sensitive areas, the massage planner is configured to provide a balanced massage, such as according to the generic/default priors described above.

Suppose that the member does provide specific instructions on focus/sensitive areas. If so, such specific region inputs are provided higher weight in an objective function, allowing the plan to deviate from the priors, toward the user's preferences.

One example of an objective function is as follows:

$$\min \sum\nolimits_{r \in R} \left( D_r^T + D_r^I \right) - K \sum\nolimits_{g \in G} R_g$$

In this example equation:
$D_r^T$ and $D_r^I$ represent deviation from target time and intensity in region r
If no member goals are provided (G is empty), then the massage planner is configured to minimize total deviation from target time and intensity across all regions to ensure a balanced plan
If a specific goal is provided (e.g., the user has indicated to devote extra time to do high-intensity work on the glutes, specifying a target time and target intensity for a specific target region), then this allows the massage planner to incur some deviation to satisfy the member goal (where K is a parameter that is tunable to determine how responsive the massage planner is to member's goals, where there may be rewards for achieving the goals).

The following are further details regarding the massage planner. In some embodiments, the massage planner is configured to generate a massage plan based on information from the user preferences, the body model, and the stroke path library. In some embodiments, the overall plan generation utilizes information from the user goals to decide which stroke paths (from the stroke path library) to use, and which sequence of the stroke paths is optimal.

In one embodiment, the problem to be solved by the massage planner can be formulated as a Traveling Salesman Problem (TSP). More generally, it can be formulated as a multi-vehicle routing problem, if activities for the arms are planned individually.

In the example TSP formulation, the "cities" to be visited are the regions of the body. This would include, for example, a subset, specified by the user, of the regions in the body model of FIG. 5A. In some embodiments, conditions on the stroke paths (including those for transitions) constrain how those stroke paths are allowed to be sequenced in a massage plan. For example, a stroke path is associated with metadata indicating progression constraints. As one example, a stroke path is associated with pre conditions and post conditions. The pre conditions and post conditions include certain regions. Sequencing is based on whether the post condition region of a previous stroke path matches the pre condition region of a next stroke path.

Additional constraints on the formulation include, as described above, temporal constraints on the duration of the entire massage (for example, a user may only have half an hour, rather than a full hour). Another example of a constraint is temporal constraints on duration of parts of the massage, such as how long (or how much time) to spend on a particular region.

The following is another example of massage replanning by solving a constrained optimization problem and using objective functions. In some embodiments, a user preference is received. In some embodiments, the user preference is weighted differently to other features. For example, user-indicated preferences are weighted heavily and treated as fixed. Planning is then performed around the user desires. The optimization engine then solves a set of objective functions while optimizing over the overall constraints of the massage.

In some embodiments, the solution or output of the massage planner is a sequenced selection of stroke paths. This includes generating an initial massage plan for the session. In some embodiments, the massage planner is configured to perform replanning of the massage plan. For example, as described above, the previously generated solution (e.g., initial massage plan or previous massage plan) is replanned in response to drift (e.g., temporal drift) or change in member goals (e.g., based on user feedback during execution of the current massage plan). In some embodiments, massage replanning includes leveraging the same massage planner system, including providing the massage planner system with the current state along with suitably modified objective functions (e.g., that reflect how the member's goals have changed during the session). In some embodiments, the massage planner solves the optimization problems (where the member, session goals, and session length are encoded into the objective functions that capture what is to be minimized/maximized) in an efficient manner to provide near real-time responsiveness, which in turn provides an improved member experience.

In some embodiments, the framing of the problem as an optimization problem as described herein includes costs/rewards associated with the stroke paths in the massage plan.

In some embodiments, the reward for a stroke path is a function of user preferences for stroke paths, force, speed, as well as other stroke path parameters. In some embodiments, rewards are also used to express stroke path or region sequencing preferences.

In some embodiments, the massage planner uses a solver that uses a neighborhood search to produce a massage plan that maximizes reward, while satisfying or obeying all the constraints. Such an approach is data-driven, where the formulation is separate from the solver, thus simplifying code maintainability and maximizing flexibility. A mixed-integer linear program solver also separates the formulation from the details of the solution. In particular, such a framework for massage planning as described herein avoids complex, brittle code in which planning policies are embedded deep inside algorithms, rather than being stated explicitly as part of the formulation.

The following are further embodiments of performing massage (re) planning using a constrained optimization framework.

As described above, using an optimization framework includes optimizing a set of objective functions given a set of constraints. In some embodiments, the objective functions whose values are to be maximized or minimized correspond to, or are otherwise associated with, member preferences. The following are examples of modeling or encoding user preferences as objective functions.

The following are three example aspects of objective reward functions that are to be learned that are associated with preferences. In some embodiments, the objective functions are estimated over time based on past sessions for a given member. For example, different users may be associated with different reward functions (functions with different parameters) based on their historical preferences.

One example aspect is region-based rewards. For example, different users may want the robotic massage system to focus on different parts of their body. A weightlifter may have a preference for more work on the shoulders, while a tennis player may have a preference for more work on their hamstrings. In some embodiments, for each member, a region-based objective function is learned for the given member. For example, for the tennis player, a region-based objective function that provides a greater reward for hamstring work is learned, while for the weightlifter, a region-based objective function that provides a greater reward for the shoulders is determined.

Objective functions are determined based on a variety of criteria, including, without limitation, historical feedback provided by the member, regions that the robot system has been determined to spend time on, etc. Such information is used to determine the relative value that a user places on various regions of the body for massage sessions. In some embodiments, the region-based objective function is used to determine how to divide up the overall amount of time allocated to the massage during a session amongst various parts or regions of the body. Different partitions may be determined for different people. The region-based objective function is used to determine which parts of the body the robotic massage system is to focus more or less on, based on what has occurred in the past.

In some embodiments, an objective function includes multiple terms or variables. In some embodiments, a selected sequence of strokes is passed to the objective function. The characteristics of the selected sequence of strokes are used to determine the values for the various terms in the objective function. A score is then determined by computing the objective function given the input massage plan (selected sequence of strokes). The output score is a value that represents a reward. In some embodiments, selected sequences of strokes are determined until an optimal one is found (that maximizes one or more objective functions). In the example of a region-based objective function, the output value is indicative of how much the user's region-based preferences are being met by the input sequenced selection of strokes of a candidate massage plan being evaluated.

As one example, sensor data is received when a stroke is being executed. In some embodiments, each stroke is associated with geometric data. In some embodiments, the geometric data is mapped to anatomical features. From the raw sensor data, it is determined which part of the body that stroke is played over. For example, regions of coverage of the stroke are inferred from the geometric aspects of the stroke itself. Other region-based information that can be inferred includes what muscles that the stroke will go over. Such information may be used as a term in the region-based objective function. In some embodiments, each stroke is associated with metadata indicating what region that the stroke is matched to.

Returning to the example of a region-based model for the tennis player who has a region-based preference for strokes that operate on the hamstrings, suppose that there are 500 strokes in the stroke library. Suppose that 50 of those strokes operate on the hamstrings. In this case, all 50 of those strokes are candidates for optimizing the region-based reward, as all of those strokes would result in rewards.

In some embodiments, the massage planner is further configured to select which of the candidate strokes to ultimately include. In some embodiments, historical information is used to make the selection among the strokes determined to be associated with the preferred region. For example, users are provided the ability to provide feedback on whether or not they liked a previous stroke. Suppose that there was a particular stroke that the user had previously indicated that they liked. In some embodiments, from the 50 candidate hamstring strokes, the three strokes (or any number as appropriate) that are most similar to that user-indicated stroke are selected (e.g., have the greatest overlap in characteristics). In this way, feedback from members is used to determine what strokes the user is likely to enjoy in a specific region. This is another example aspect term in the region-based objective function (e.g., stroke-similarity term), which (on top of rewarding strokes that are in user-preferred regions) is determining a high score or value by including content that is similar or equal to strokes that the user has liked in the past (or that is similar to strokes that other, demographically similar members have indicated a preference for).

A third example term in the region-based objective function is intensity. For example, a given stroke may be played at varying levels of intensity. For example, the stroke may be applied with a light or heavy touch (e.g., different amounts of force being applied). Different users may have different preferences for the level of intensity. In some embodiments, users are provided the ability to adjust the intensity when a stroke is occurring. In some embodiments, such historical intensity feedback information from the user is used as a signal to determine the optimal intensity for a given stroke for the specific user. That is, beyond the selection of strokes to include, and the sequencing of the strokes, the intensity of the strokes is another element that is optimized for the user based on historical intensity feedback information, user-indicated preferences for the current session, etc.

In some embodiments, each stroke is associated with a value indicating an intensity for the stroke. In some embodiments, the stroke intensity metadata values are used by the intensity parameter of the objective function to score the intensity of the strokes in a candidate massage plan relative to historical user preferences. In various embodiments, intensity metadata values include specific intensity values, ranges of intensity, threshold levels of intensity (e.g., lower and/or upper bounds), etc.

In some embodiments, candidate massage plans are scored based on the objective function(s). The candidate massage plan that is provided as output is the one that is determined to maximize the score outputted by the objective function while still satisfying constraints. For example, given a space of all possible massage plans (with various sequences and selections of strokes), various candidate massage plans are evaluated by the objective function (e.g., to determine how well they match to user preferences) given a set of constraints. The candidate massage plan that provides the most reward while meeting the set of constraints is then provided as output as the optimal massage plan given user preferences, state of the massage session, and the set of constraints. As described above, it may be the case that the outputted massage plan may be lacking in one or more areas. In some embodiments, the massage planner notifies the user of such areas and provides suggestions or proposals of relaxations of constraints. The massage planner then performs computation of the objective function to score candidate massage plans, this time with updated constraints.

The following are further embodiments of determining proposals or candidates for updates to the massage planning to facilitate improved determination of optimal massage plans. As one example, as described above, the preferences of the user are encoded in the objective function such that strokes that match more closely to the encoded user preferences are rewarded more (e.g., given a higher score) as compared to strokes that do not match to the encoded user preferences as much. Some of the user preferences may be provided by the user directly. In other embodiments, the preferences are inferred from a learned model of the user. For example, suppose that in the past, the user has indicated that they like a certain massage stroke. However, for the current session the user has indicated (e.g., via the UI) that they do not want that stroke. If adding that type of stroke would help to improve the massage plan (e.g., help to meet the remaining session time), then the massage plan can suggest the inclusion of a stroke that the user has previously indicated as having a preference for. As another example, suppose that previous massage plans have not included massage work in the region of the lower back, and that the absence of this region is included in the learned model of the user. For example, the objective function does not provide additional reward or incentive for strokes that operate in that region, as it is inferred (by the lack of historical work in the lower back) that the region is not one that the user has a preference for. In this example, the massage planner can suggest to the user that they can add work to the lower back. The user can then indicate that they would like to have work in the lower back, in which case the region-based parameters of the objective function can be updated to provide a higher reward to strokes that operate in that region. If the user indicates or confirms that they do not have an interest in work in the lower back, then the objective function is not updated (or if the user indicates a dislike, then that region can be updated to be scored even lower).

The use of the optimization-based framework described herein facilitates collaborative interaction between the user and the massage planner system to determine an optimal massage by identifying and providing the opportunity to relax constraints that were initially applied.

The use of the optimization-based framework described herein provides various benefits. As one example, the use of the optimization-based framework facilitates the identification of edge cases. For example, suppose that there are 20 minutes remaining in a massage. The massage planner is requested to perform massage replanning based on user feedback. The optimization described herein is performed, resulting in an output massage plan. Suppose that the outputted massage plan based on the scoring described above, which is the optimal massage plan based on the current state of the massage session and the user feedback while also meeting constraints, is much less than 20 minutes. In this case, the solver was unable to determine a plan that met user preferences, satisfied constraints, and also effectively used up all of the remaining session time. In this example, based on the outputted massage plan not meeting the remaining session time, the massage planner determines suggestions or recommendations. For example, the massage planner is configured to indicate to the user that a massage plan that would meet their preferences, satisfy constraints, and also take up the remaining time could not be determined. The massage planner then suggests to the user constraints or preferences that, if relaxed, would result in massage plans that can fill the remaining time more closely. Providing suggestions or recommendations to the user further improves the user interaction experience.

As shown in the above, in various embodiments, an objective function is used to evaluate a candidate massage plan (sequenced selection of strokes), with parameters of the objective function to be optimized including optimizing selection of regions in which work is performed, optimizing selection of strokes that are similar to what the user has previously indicated as liking, and optimizing intensity levels of strokes. In the above example, one or more objective functions are used to determine an optimal massage plan that maximizes the objective function with respect to regions of work, stroke similarities, and intensity to match the user's preferences as much as possible, while also satisfying constraints. For example, massage plan (re) structuring is implemented as a constrained optimization problem, including solving selection and sequencing objective functions according to constraints.

Other examples of techniques for solving such an optimization problem include the use of heuristic models, rules-based approaches, etc. For example, a hierarchical rules-based approach may be used to select and sequence strokes. As one example of a hierarchical model for massage planning, a massage is organized into a hierarchy, where at the top of the hierarchy is the overall massage. At the next level are sections of the massage. In some embodiments, sections correspond to body regions (e.g., shoulders and back). Within a section are segments. In some embodiments, segments of massage work include a warmup period, a therapeutic massage work period, and a cooldown period. In some embodiments, various rules and conditions are applied at each level. The rules and conditions may be used to enforce certain conditions or constraints or progressions of strokes, including relationships among content that are used to determine massage replanning, selection of massage strokes, reordering of massage strokes, etc.

The following are additional embodiments of frameworks for performing selection and sequencing when (re) structuring a massage plan.

As another example of sequencing, the sequencing is performed by a sorting process. For example, suppose content is selected. Sequencing is to be performed on the selected content. In some embodiments, the sequencing is performed by sorting of the content. For example, individual pieces of content (or groups or segments of content) are weighted by massage or therapeutic value. For example, content that is more valuable for a user is weighted more highly. The value assigned to a piece of content may be personalized to the user (e.g., with the same content being assigned different values for different people depending on their preferences). The sequencing is performed by sorting content that is more valuable into the massage. Other approaches may also be used to determine a best-fit, or optimal selected sequence of strokes for a user. As one example, a rules-based approach can be used in which constraints and preferences may be encoded via if/else statements.

As another example, the massage planning is performed according to iterative selection criteria. For example, the massage plan is built up iteratively, until the massage is full (e.g., the massage plan includes an amount of content whose execution time, in aggregate, is within a threshold deviation (e.g., buffer) from the allocated session time). For example, while the massage is not full, a next segment is selected. The criteria for selecting the next content is based on what has been included in the massage plan so far, requirements for a given region/area, what requirements have been met and/or not yet met, etc. The segments are selected based on such criteria in a loop. After selection, the selected segments are reordered.

As another example, the massage plan is hierarchically generated, where different objectives or preferences are handled in layers. The handling of the layers may be performed according to a prioritization. For example, suppose that the massage plan is to be structured to provide coverage for certain areas with a certain intensity. Suppose that region coverage is more highly prioritized. In this example, the regions to be covered are determined. For each region, a database of massage content is accessed, and content corresponding to a given region is obtained.

Planning is then performed within each individual region. For example, suppose that the glutes are one region to be covered. Content from the massage stroke database has been selected that applies to the glutes region. The individual pieces of content pertaining to the glutes are then ordered. For example, the sub-massage plan for the region is ordered according to a structure that begins with a warm-up of the glutes, then a certain type of massage work (e.g., deep tissue work on the glutes), then a cool down of the glutes. The selected content is then ordered to fit this template structure.

The same structure may be applied for other regions. For example, for the content selected for the upper back, the content is sequenced into strokes for warming up the upper back, strokes for performing deep tissue work on the upper back, and then strokes for cooling down the upper back.

As shown in this example, encoding segments as a type of structure within a massage plan facilitates managing progression of content that is added in.

Figure 9:
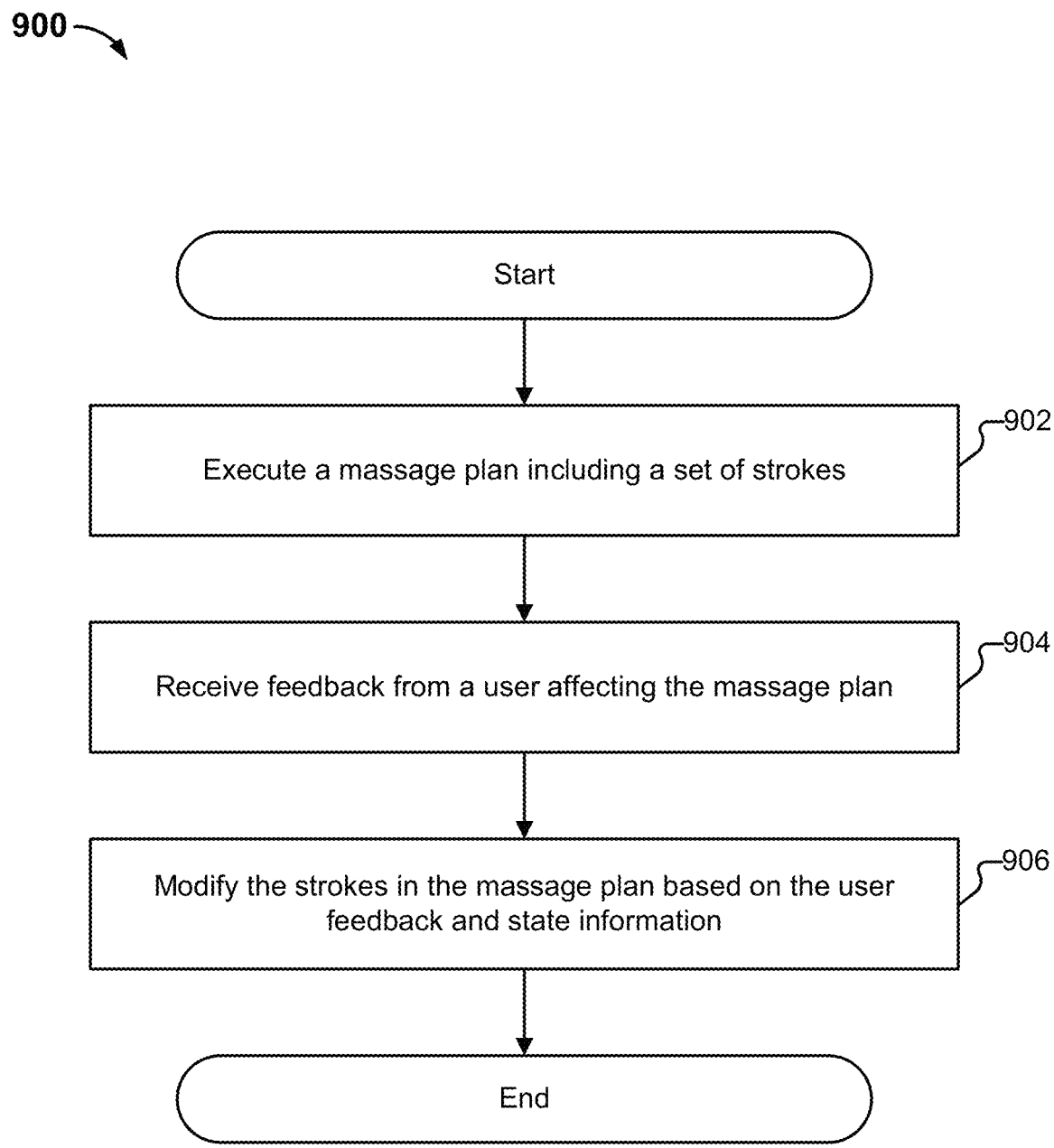
FIG. 9 is a flow diagram illustrating an embodiment of a process for massage planning.

FIG. 9 is a flow diagram illustrating an embodiment of a process for massage planning. In some embodiments, process 900 of FIG. 9 is executed by massage manager 300 of FIG. 3.

The process begins at 902 when a massage plan including a set of strokes is executed. For example, an initial massage plan is determined and executed.

As one example, the initial plan is generated based on a variety of inputs, such as a body model of the massage subject (where the body model may be based on a scan of the subject), and prior or historical massages performed on the user. Another input is a database of strokes (e.g., stroke library described above). Other examples of inputs include member goals, preferences, dislikes, indications of areas to focus on, indications of areas to avoid, etc. The user may also provide an indication of overall session time, relative time to spend in certain regions or for certain types of work, etc. User inputs may be received in a variety of ways. For example, the user may provide inputs via a mobile app on a portable device, where the user inputs are communicated to the massage planner system. The user may also provide the inputs at a kiosk that is on-premise with the robotic massage system. As another example, the user may also provide inputs via controls on the robotic massage system itself (such as via a touchscreen accessible to the user).

Allowing users to provide input regarding how they would like to customize their massage facilitates a collaborative experience. In some embodiments, a massage plan is still generated even if the user does not provide any further information about their massage preferences. In some embodiments, if user input is not provided, default or target values, or values from similar users are used to determine how to customize the massage plan for the current user.

In some embodiments, structuring a massage plan includes accessing a library of massage content. Content is selected from the library based on the aforementioned inputs such as user preferences or goals, etc. Reordering of the content is also performed to determine a sequenced selection of content to be played.

In some embodiments, the initial plan is generated from the ground up (e.g., starting from the library of all available content, without an existing structure for the massage plan). In other embodiments, the initial plan is a previously generated plan, such as a curated plan. In some embodiments, the initial plan is generated by modifying a curated plan (modifying an existing massage plan structure that includes a subset of available content).

In some embodiments, the massage planner system is configured to select, from a larger set of stroke paths or trajectories (e.g., from a stroke library such as that described above), a down-selected set of strokes to be played, as well as the order in which the selected set of strokes is played.

The initial massage plan is then executed. In some embodiments, the robotic massage device is configured to execute each massage stroke in order, according to the massage plan specification. In some embodiments, each stroke path defines a trajectory along the subject's body that the robotic arms of the robotic massage device are controlled to trace or follow, while applying a specified amount of pressure. In some embodiments, replanning is performed.

At 904, feedback is received from a user that affects the massage plan. Various examples of feedback are described above. For example, feedback may be provided relative to what is currently occurring in the massage plan. For example, users may indicate that they would like more of a type of content that was just played or is being played. The user may also indicate that they would like to avoid further work in a region of the body that the end effector is currently interacting with.

At 906, strokes in the massage are modified based on the received user feedback as well as state information received during execution of the massage plan.

As described above, one example of state information includes information such as the amount of remaining time in a massage session. For example, based on received feedback played during a nominal massage plan, customizations or changes to the sequence of strokes in the nominal massage plan are implemented according to a set of constraints. For example, replanning is performed if, during execution of a current plan, drift or changes to member goals are detected. Replanned massage plans are then executed by the plan executor. One example of detecting drift includes determining the amount of time remaining in the allotted massage time, as well as the time required to complete the remaining stroke paths in the sequenced selection of stroke paths. In some embodiments, deltas or differences or discrepancies between the remaining available time and the required stroke execution time trigger replanning of the massage plan. For example, if execution of the remaining current sequence of massage strokes will complete before the allotted time is up, then one or more additional massage strokes are selected and added in a location within the massage plan (to extend the amount of massage content being played). If the time required to execute the remaining stroke paths will exceed the allotted time, then in some embodiments, the massage planner is configured to select one or more strokes in the sequence for removal.

The following is another example of massage plan adaptation to temporal drift. In some embodiments, the user's massage is associated with a session duration. Based on the session duration, the massage will end at a certain "wall-clock" time. In some embodiments, the selected sequence of stroke paths is generated such that its execution will coincide with the duration of time allotted for the massage. Temporal drift may occur over the course of the massage. For example, the user may request to make an adjustment, or pause the massage. This may result in the remaining allotted massage time deviating from the remaining massage execution time (to play the remaining massage stroke paths in the sequence). In some embodiments, the robotic massage system is configured to detect such drift (e.g., that the massage will end early or late relative to the end time based on duration—that is whether the massage is behind time or ahead of time) and perform massage replanning based on detected temporal drift. In some embodiments, the robotic massage system is configured to periodically monitor for temporal drift.

The following are further embodiments of performing massage (re) planning, including mapping a user input command to a set of massage plan adaptations. User input commands or feedback may be provided at various resolutions.

As one example, the user may input a command indicating that they would like focused work in a certain region. In this example, the term "focused" is a measure of desired intensity. The region specified in the user command indicates a desired body region. The intensity and region indicators extracted from the user command are used to perform a search of candidate strokes that match or otherwise map to the user commands. In some embodiments, the search is facilitated based on metadata tags associated with strokes in a stroke library. For example, each stroke in a stroke library is associated with an intensity level and a region to which the stroke is applicable. In this example, strokes that have a requisite level of intensity to qualify as "focused" include cross-fiber frictions, pin and hold-type techniques, targeted compressions, targeted circular friction, etc. Strokes that are applicable to the user-indicated region include those strokes that have a radius or area of coverage that overlaps the user-indicated region.

In this example, candidate strokes are selected. The robotic massage system is configured to replan the remainder of the massage plan in response to the user's input command of what they would like to do next. Determining of which candidate stroke to ultimately select and where it should go in the remainder of a massage plan being adapted is then performed. In some embodiments, a constrained optimization problem is solved in order to determine how to adapt the remainder of a massage plan in a manner that both satisfies the user commands, and does not violate constraints (e.g., time constraints, safety constraints, etc.). In some embodiments, the massage system performs implicit planning, which may be overruled by explicit user commands. For example, the massage planner attempts to accommodate user commands in order to empower the member to obtain their desired experience.

In some cases, member objectives, inputs, and system constraints may conflict with each other in a manner in which not all constraints can be satisfied. In some embodiments, the system maintains a record of, or otherwise keeps track of which constraints are not satisfied or are being violated, and the reason behind the violation of the constraint. For example, suppose that a user indicates that they want a 60-minute massage. The user also indicates that they want the massage to cover multiple regions. The user also indicates that they want 50 minutes of massage time spent in the glutes. In this example, suppose that the robotic massage planner is unable to determine a plan that satisfies the user's input commands, while also satisfying minimum constraints on amount of time spent in all of the areas the user wanted to have coverage of. In response to determining that a massage plan is unable to be generated that satisfies all user preferences and constraints, the massage planner system performs one or more recovery actions. As one example, the massage planner system provides output such as an alert or notification to the subject indicating that a massage plan could not be generated based on the user's input and minimum constraints. In some embodiments, information about what aspects of the user command could not be satisfied is presented. In some embodiments, a reason why an aspect of a user's commands could not be satisfied is presented. In some embodiments, recommendations or suggestions on how to adjust massage parameters in a manner that results in generation of a permissible or compatible massage plan are provided.

Continuing with the above example, the user may be prompted that a massage that includes 50 minutes of glute work can be generated if the massage does not cover the other areas of the user's body. In this example, the user is provided different choices or options. For example, if the planner determines that a certain constraint could not be satisfied given the user's command, the planner provides the user the option to either accept the command (but with content removed in other areas to accommodate content that would be included due to the user command), or to retract the command.

As shown in this example, the robotic massage planner system is aware of any objectives or constraints that are not able to be met, and is configured to communicate that awareness to users.

In some embodiments, the user is allowed to provide multiple rounds of feedback with the robotic massage system, facilitating collaborative massage planning. As shown in this example, when executing an initial massage plan, the planner is configured to recognize drift from that initial plan (where the drift may be from user expectations or constraints), and in response, provide a prompt to the user communicating the delta from the initial plan, and provide options that allow a user to provide feedback to generate an optimal plan in light of constraints.

As described above, in various embodiments, supporting massage planning includes enforcement of various constraints, such as those with respect to time, as well as supporting adaptations (e.g., adaptation to time drift, area-based time allocations, allocations of time with respect to stroke type and intensity, etc.), as well as reordering of massage content according to member preferences (either initial preferences prior to massage execution, or updated preferences received during the massage).

In some embodiments, a massage plan is associated with an expected time (to complete execution of the entire massage plan), a maximum time, and a minimum time. As one example, suppose that the massage is expected to take 60 minutes (e.g., 60 minutes of planned content). Suppose that the minimum massage time is 40 minutes. If the available time remaining in the session is less than the minimum massage time, then it is unlikely that all of the content in the massage plan can be performed. That is, it is expected that a minimum of 40 minutes is needed to cover every part of the body specified in the massage plan. There are various reasons why a user may have less available time than the allotted time. For example, the user may have spent additional time in a certain area. As another example, the user could have paused and used the restroom or performed stretches.

The following is a further example of performing massage planning. In this example, further details regarding determining an initial massage plan are described. In some embodiments, prior to performing the massage, the user may provide various inputs such as goals (e.g., therapeutic goals), preferences, dislikes, injured areas, etc. For example, the user may provide the inputs via an interface such as interface 108 or tablet 110 of the robotic massage system. The user may also provide inputs via a companion mobile application on their mobile device.

In some embodiments, prior to performing or execution of a massage, a body scan is taken of the massage subject.

The following are examples of adaptations that are implemented by the massage planning system described herein. In some embodiments, the atomic elements of a massage are stroke paths. In some embodiments, a massage plan is generated by determining a sequence of selected stroke path elements.

The massage planning system described herein facilitates collaboration between the massage subject (human user) as well as the robotic massage system. For example, the person provides various inputs, such as preferences, history, etc. Based on the user information, the massage planner system is configured to generate a proposed massage plan (e.g., emulating the collaboration between a user and a human massage therapist).

As described above, the user's inputs may be specified according to a set of dimensions. For example, suppose that the user wishes to have a full body massage that covers the entire body. In this example, the user conveys their desire to have an overall body massage by, for example, selecting a full body massage from a menu of massage options.

Suppose that the user would also like to indicate that today they have pain in their lower back on the right side, and that they would like to spend additional time on that region to relieve the pain. In this example, the user conveys this information for the current massage session by indicating a body region to focus on (lower back on the right side of their body). The user may also indicate a reason for wanting to focus on the indicated body region (to relieve pain). The user may also indicate that they would like additional time (or a relatively larger portion of time of the session) to be spent on the indicated body region (e.g., where indicating the desired increase in focus is mapped to increased time in that body region). The region and additional time preferences may be provided in a variety of manners, such as via physical buttons, a touch screen, voice commands, etc.

The massage planner system is configured to take as input the user's indicated preferences and goals for the massage to be performed, and is configured to perform collaborative plan diagnosis to attempt to generate a massage plan that meets the user's goals/preferences, while also adhering to a set of constraints. One example constraint is a time constraint. For example, the massage session may be subject to a time limit constraint. In this case, the user has requested a full body massage that covers the entire body, while also indicating that they would like to have additional time and focus spent on the right side of their lower back where they indicated as having pain.

The massage planner system is configured to attempt to generate a massage plan that will cover the subject's entire body, while spending additional time on the right side of their lower back, while also fitting within the allotted amount of time for the massage session. For example, the massage planner system generates an optimal massage plan by solving a constrained optimization problem. For example, suppose that the user has indicated that an objective of their massage is to cover the areas X, Y, and Z. Suppose that the user has been allotted one hour of time for the massage. The massage planner system is configured to determine a sequenced set of massage strokes that will traverse and provide coverage of the user's indicated regions of interest, while providing a certain amount of time in each of the desired regions such that in aggregate, the allotted massage time is not exceeded. Further details regarding solving of such a constrained optimization problem are described above.

If the massage planner system is able to generate a massage plan that satisfies the user's preferences as well as the constraints, the massage plan is returned as an initial massage plan. If the massage planner system is unable to converge on a massage plan that both satisfies the user's preferences/goals, and meets the constraints, in some embodiments, the massage planner system is configured to provide a notification as output. For example, the system indicates that spending additional time on the right side of the lower back will require extending the massage time if coverage of the full body is still desired (and is a user-indicated objective of the massage). In some embodiments, the system provides suggestions on massage strokes to remove to satisfy the preferences while meeting the time constraints. For example, the system may suggest regions of massage work to be skipped. As one example, the massage planner system may suggest that the work on the shoulders be skipped. The massage planner system may provide a number of different options for how to accommodate the user's goals/preferences.

The user may then indicate how they would like their massage to be adapted to accommodate their preferences/ goals. The massage planner system then takes the feedback and facilitates collaborative plan diagnosis by performing adaptations on the massage plan and/or its elements.

One example type of adaptation, as shown above, is with respect to strokes that are included in the massage plan. In various embodiments, adaptations with respect to strokes include adding strokes, removing strokes, changing the sequence of strokes within the massage plan, etc.

Another example type of adaptation is within an individual stroke itself. For example, an individual stroke is parameterized for individuals. For example, within a stroke, the stroke is associated with parameters such as force, position, etc. The within-stroke adaptation includes adding additional force, making adjustments to position, etc. for the specific stroke.

The massage planner system described herein may support other types of adaptations in addition to the aforementioned two categories of adaptations (stroke selection/sequencing adaptations in a massage plan, and stroke parameter adaptations within an individual stroke path) described above.

The following are further embodiments of determining adaptations to a massage plan that includes a sequenced selection of stroke path elements (also referred to herein as stroke paths).

In various embodiments, determining, adapting, or modifying a massage plan includes changing the stroke paths in the massage plan and/or changing the sequencing of stroke paths in the massage plan. In various embodiments, adapting a massage plan includes adding stroke path elements, removing stroke path elements, etc.

In some embodiments, the massage planner is configured to perform search and optimization to determine an optimal massage plan given user preferences and constraints. In some embodiments, the massage planner system is configured to determine whether user requests would violate constraints, such as causing the time of the massage to be pushed beyond a duration limit (time constraint).

Another example constraint is safety constraints, which may be related to clinical presentation. This includes adapting a massage plan based on indications of injuries or other clinical indicators. For example, an individual stroke parameter includes a pressure range. If the user has a clinical presentation indicative of edema, the massage planner adjusts the pressure parameter of the stroke path to lower the cap or maximum upper pressure range for certain strokes.

As another example, if the user indicates that they have pain in a certain body region, or that they had surgery in a region, then this is translated into a body region constraint that is to not be violated for safety reasons. For example, enforcing the safety constraint includes prohibiting selection of stroke paths that operate in the body region that is to be avoided. Due to enforcement of safety constraints (to protect the subject's health), the massage planner system may decide that a massage cannot be provided at all. For example, a user may be contraindicated from receiving a massage at all. As one example, if the user indicates that they recently had ankle surgery, then the massage planner system may return that a massage cannot be generated, as performing any sort of massage work, even lower back decompressions, could cause the user's leg to move, exacerbating their injury.

Another example of a constraint to be enforced (or to prevent violation of) is sequencing or progression constraints. In some embodiments, a sequencing constraint is a constraint on what stroke can precede or follow another stroke.

As described above, the massage planner is configured to, based on user inputs and a set of constraints, determine a sequenced selection of massage strokes (that form a massage plan) that satisfies the user's requests while not violating the set of constraints.

The following is another example of massage planning.

As described above, examples of inputs to the massage planner include user preferences and goals (e.g., user personalization parameters for personalizing the massage plan). In some embodiments, the robotic massage system is configured to infer, derive, or otherwise determine user preferences and goals from the feedback inputted by the user. In some embodiments, machine learning is used to learn user preferences from the feedback they provide (not only from the current session, but also from historical past sessions in some embodiments).

In some embodiments, the massage planner is configured to solve a set of optimization problems to determine what content to include (or not include) that provides the user the most value in terms of their preferences (likes and/or dislikes) while also taking into consideration various constraints. One example type of constraint includes temporal constraints (e.g., amounts of remaining session time that should not be exceeded based on the amount of time that different strokes take to be executed). Another example type of constraint includes precedence or progression constraints, which includes enforcing certain types of content that are required to be included (e.g., for safety reasons). These can include physical constraints to be satisfied, such as having a warmup section before user-desired focused work on a part of their body. The massage planner is configured to solve a set of optimization problems to determine a massage plan that maximizes the user's preferences while satisfying constraints.

In some embodiments, the massage planner framework described herein is configured to compute an initial plan (e.g., prior to the start of the massage session), as well as computing an updated plan based on user feedback or observed drift from the current massage plan.

In some embodiments, the objective functions that are solved and optimized for are determined based on collecting measurement data and user feedback from performed massages to determine what to penalize and/or reward in the objective functions.

The following is an example of replanning in response to detected drift. In this example, replanning is performed in response to detecting temporal drift. As one example, suppose that a first section of the massage plan was expected to have been completed within 20 minutes. However, 23 minutes have elapsed. In this case, a temporal deviation or difference between the actual elapsed time and the expected elapsed time given the position in the massage plan is detected. In some embodiments, temporal drift is monitored for periodically by the massage planner.

In this example, a drift of three minutes has been detected. In order for the massage to complete within the allotted session time, that three minutes will need to be recouped down the line in the execution of the remainder of the massage plan. In some embodiments, massage replanning is performed for the remainder of the available session time based on the detected temporal drift. In some embodiments, performing replanning on the existing solution (e.g., by modifying the existing or current massage plan) decreases runtimes, allowing the massage plan to respond with an updated massage plan in near real-time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic massage system, comprising:
a robotic arm that is actuated in order to execute a massage plan comprising a plurality of strokes;
a user interface that receives feedback from a user affecting the massage plan; and
a controller that:
receives state information during execution of the massage plan; and
dynamically modifies, based on the state information and the feedback received from the user, the massage plan to obtain a modified massage plan, wherein the modifying comprises:
implementing, based on the state information and the feedback received from the user, changes to the massage plan to obtain a changed massage plan;
determining that the changed massage plan violates a constraint of a set of constraints, wherein the changed massage plan relates to an updated plurality of strokes; and
in response to the determination that the changed massage plan violates the constraint, replanning the changed massage plan based on an objective function, wherein the massage plan is inputted into the objective function to obtain the modified massage plan, wherein the updated plurality of strokes relates to a corresponding plurality of weights to be inputted into the objective function, wherein the replanning comprises selecting a candidate massage plan from a set of candidate massage plans based on the objective function and the set of constraints, wherein the selected candidate massage plan corresponds to the modified massage plan, wherein the selected candidate massage plan comprises a candidate sequence of massage strokes and transition strokes, wherein each transition stroke moves the robotic arm to connect two of the massage strokes, wherein the selecting the candidate massage plan is based at least in part on minimizing, using the objective function, an amount of time in which the transition strokes are performed, and wherein the minimizing is facilitated at least in part by assigning different weightings of therapeutic value to the transition strokes as compared to the massage strokes.

2. The robotic massage system of claim 1, wherein modifying the massage plan is performed according to a progression constraint.

3. The robotic massage system of claim 2, wherein the progression constraint comprises a constraint on permitted sequencing of the plurality of strokes in the massage plan.

4. The robotic massage system of claim 1, wherein modifying the massage plan further comprises stroke removal or stroke insertion.

5. The robotic massage system of claim 4, wherein the stroke removal comprises changing a designation of a removed stroke in the massage plan from being played to being skipped.

6. The robotic massage system of claim 4, wherein the stroke insertion comprises changing a designation of a stroke to be inserted from being skipped to being played.

7. The robotic massage system of claim 4, wherein the stroke insertion comprises selecting a stroke from a set of surplus content to insert into the massage plan.

8. The robotic massage system of claim 1, wherein the user feedback comprises a request to perform more of a current type of massage work.

9. The robotic massage system of claim 1, wherein the user feedback comprises a request to perform less of a current type of massage work.

10. The robotic massage system of claim 1, wherein the user feedback comprises a request to skip to a next section in the massage plan.

11. The robotic massage system of claim 1, wherein the user feedback comprises a request to perform focused work on a current location of the user's body.

12. The robotic massage system of claim 1, wherein the user feedback comprises an indication of a sensitive area of the user's body.

13. A method, comprising:
- executing a massage plan comprising a plurality of strokes, wherein a robotic arm is actuated in order to execute the massage plan;
- receiving feedback from a user affecting the massage plan;
- receiving state information during execution of the massage plan; and
- dynamically modifying, based on the state information and the feedback received from the user, the massage plan to obtain a modified massage plan, wherein the modifying comprises:
  - implementing, based on the state information and the feedback received from the user, changes to the massage plan to obtain a changed massage plan;
  - determining that the changed massage plan violates a constraint of a set of constraints, wherein the changed massage plan relates to an updated plurality of strokes; and
  - in response to the determination that the changed massage plan violates the constraint, replanning the changed massage plan based on an objective function, wherein the massage plan is inputted into the objective function to obtain the modified massage plan, wherein the updated plurality of strokes relates to a corresponding plurality of weights to be inputted into the objective function, wherein the replanning comprises selecting a candidate massage plan from a set of candidate massage plans based on the objective function and the set of constraints, wherein the selected massage plan corresponds to the modified massage plan, wherein the selected candidate massage plan comprises a candidate sequence of massage strokes and transition strokes, wherein each transition stroke moves the robotic arm to connect two of the massage strokes, wherein the selecting the candidate massage plan is based at least in part on minimizing, using the objective function, an amount of time in which the transition strokes are performed, and wherein the minimizing is facilitated at least in part by assigning different weightings of therapeutic value to the transition strokes as compared to the massage strokes.

14. The method of claim 13, wherein modifying the massage plan is performed according to a progression constraint.

15. The method of claim 14, wherein the progression constraint comprises a constraint on permitted sequencing of the plurality of strokes in the massage plan.

16. The method of claim 13, wherein modifying the massage plan further comprises stroke removal or stroke insertion.

17. The method of claim 16, wherein the stroke removal comprises changing a designation of a removed stroke in the massage plan from being played to being skipped.

18. The method of claim 16, wherein the stroke insertion comprises changing a designation of a stroke to be inserted from being skipped to being played.

19. The method of claim 16, wherein the stroke insertion comprises selecting a stroke from a set of surplus content to insert into the massage plan.

20. The method of claim 13, wherein the user feedback comprises a request to perform more of a current type of massage work.

21. The method of claim 13, wherein the user feedback comprises a request to perform less of a current type of massage work.

22. The method of claim 13, wherein the user feedback comprises a request to skip to a next section in the massage plan.

23. The method of claim 13, wherein the user feedback comprises a request to perform focused work on a current location of the user's body.

24. The method of claim 13, wherein the user feedback comprises an indication of a sensitive area of the user's body.

* * * * *